US007246358B2

(12) United States Patent
Chinnici et al.

(10) Patent No.: US 7,246,358 B2
(45) Date of Patent: Jul. 17, 2007

(54) METHODS, SYSTEM AND ARTICLES OF MANUFACTURE FOR PROVIDING AN EXTENSIBLE SERIALIZATION FRAMEWORK FOR AN XML BASED RPC COMPUTING ENVIRONMENT

(75) Inventors: Roberto Chinnici, Sunnyvale, CA (US); Rahul Sharma, San Jose, CA (US); Phillip B. Goodwin, Cupertino, CA (US); Douglas C. Kohlert, Gilroy, CA (US)

(73) Assignee: Sun Microsystems, Inc., Menlo Park, CA (US)

( * ) Notice: Subject to any disclaimer, the term of this patent is extended or adjusted under 35 U.S.C. 154(b) by 848 days.

(21) Appl. No.: 10/118,153

(22) Filed: Apr. 9, 2002

(65) Prior Publication Data
US 2003/0191803 A1 Oct. 9, 2003

(51) Int. Cl.
G06F 13/00 (2006.01)
(52) U.S. Cl. .................. 719/315; 719/313; 719/316
(58) Field of Classification Search ............... 719/315, 719/316, 314, 330, 332, 313; 718/101
See application file for complete search history.

(56) References Cited

U.S. PATENT DOCUMENTS

| | | | |
|---|---|---|---|
| 4,638,298 A | 1/1987 | Spiro | |
| 5,991,806 A * | 11/1999 | McHann, Jr. | 709/224 |
| 6,732,118 B2 * | 5/2004 | Hermann et al. | 707/103 R |
| 6,848,108 B1 * | 1/2005 | Caron | 719/315 |
| 2002/0023173 A1 * | 2/2002 | Jacobs et al. | 709/245 |
| 2002/0046304 A1 * | 4/2002 | Fabri et al. | 709/331 |
| 2002/0199031 A1 * | 12/2002 | Rust et al. | 709/315 |
| 2003/0005169 A1 * | 1/2003 | Perks et al. | 709/315 |
| 2003/0105654 A1 * | 6/2003 | MacLeod et al. | 705/7 |

OTHER PUBLICATIONS

Web Services Description Language (WSDL) 1.1., W3C Note, Mar. 15, 2001, pp. 1-51.
Hunter, Jason, "Servlet 2.3,: New Features Exposed" Reprinted from JavaWorld, Jan. 2001, pp. 1-21.
Simple Object Access Protocol (SOAP) 1.1, W3C Note May 8, 2000, pp. 1-35.
Simplified Guide to the Java 2 Platform, Enterprise Edition, Sun Microsystems, Inc., 1999, pp. 1-1 to 2-3.
Web Services Made Easier, The Java APIs and Architectures for XML A Technical White Paper, Sun Microsystems, Inc., Oct. 2001, pp. 1-29.
Coward, Danny, "Java Servlet Specification, Version 2.3," Sun Microsystems, Inc., Aug. 2001, pp. 1-257.

* cited by examiner

*Primary Examiner*—William Thomson
*Assistant Examiner*—Andy Ho
(74) *Attorney, Agent, or Firm*—Finnegan, Henderson, Farabow, Garrett & Dunner, L.L.P.

(57) ABSTRACT

Methods, systems, and articles of manufacture consistent with certain principles related to the present invention enable a computing system to receive a serialized message including a target object that is associated with at least one member object. The computing system may invoke a deserialize method on a deserializer associated with the target object. In the event the deserialize method cannot completely deserialize the target object, the deserializer may configure a state object returned by the method to monitor a deserialization status associated with the at least one member object. The deserializer may also create an instance builder object that may complete deserialization of the target object in response to receiving a notification reflecting that the at least one member object is deserialized.

64 Claims, 12 Drawing Sheets

METHODS, SYSTEM AND ARTICLES OF MANUFACTURE FOR PROVIDING AN EXTENSIBLE SERIALIZATION FRAMEWORK FOR AN XML BASED RPC COMPUTING ENVIRONMENT

CROSS-REFERENCE TO RELATED APPLICATIONS

This application relates to U.S. patent application Ser. No. 10/118,169, entitled "METHODS, SYSTEM, AND ARTICLES OF MANUFACTURE FOR PROVIDING A SERVLET CONTAINER BASED SERVICE," filed concurrently with the present application, owned by the assignee of this application and expressly incorporated herein by reference in its entirety.

DESCRIPTION OF THE INVENTION

1. Field of the Invention

This invention relates to distributed computing systems, and more particularly, to methods, systems, and articles of manufacture for providing a deserialization framework in a remote procedure call based distributed computing system.

2. Background of the Invention

In a client/server computing environment distributed over a network, one computing node, typically referred to as a client, may require data stored at another computing node, typically referred to as a server, in order to perform selected operations. For instance, a client may request services from the server by invoking remote operations. The server performs operations to process the client's request and may return data to the client, such as in a read request, or store data in a file maintained by the server, such as in a write request. Of course the roles of client and server may be reversed in other configuration. And, in still other configurations, the client and server may each represent a process operating on the same node.

Clients may communicate with a server using a number of different techniques. One such technique is the Remote Procedure Call (RPC). Using an RPC mechanism, a server may define a service as a collection of procedures that are callable by clients. The client calls these procedures to access the service maintained by the server.

RPC mechanisms are common and are generally implemented in distributed systems where a server offers services to one or more clients. With the growth of the Internet and its use in business-to-business and end-user applications, integrating RPC mechanisms for Web-based applications has gained popularity with distributed system developers. In such applications, a client performing Web-based operations may request and receive information from a Web-based server. Typically, the information is represented in HyperText Markup Language (HTML) and delivered using HyperText Transfer Protocol (HTTP). HTML encloses data in tags that specify how the delivered information is to be displayed. Although HTML allows servers to present data in specific formats and is still used in Web-based distributed systems, eXtensible Markup Language (XML) is proving to be the Web-based language of choice for distributed system developers. As with HTML, XML encloses data in tags, however, the tags relate to the meaning of the enclosed data.

Further, the XML tags are extensible, allowing a user to write their own XML tags using an XML schema language, such as the Document Type Definition (DTD) schema language. The DTD gives XML data its portability. For example, a client that receives an XML document with a defined DTD may process the document according to rules specified within the DTD, thus knowing the document's structure and content type. Also, because an XML document does not include formatting instructions, the document may be published to different types of media.

Although XML has allowed developers to expand the capabilities of Web-based data distribution, the problems associated with keeping XML documents compatible for a number of different types of computing systems, on both the client and server side, has stunted the growth of the language. Various network interoperability standards groups, such as the World Wide Web Consortium (W3C), have been defining standards for businesses to follow in providing Web-based information services. Many developers follow these standards to ensure data, such as XML documents, may be shared among heterogeneous systems. Accordingly, these developers may provide services, such as Application Programming Interfaces (APIs) that enable a computing system to send and/or receive XML documents, to/from non-compatible targets/sources.

Because a vast majority of Web-based services and applications are written or compatible with object-oriented based programming languages, such as the Java™ programming language provided by Sun Microsystems, Inc., the XML documents that are received by a computing system may include messages that represent an object hierarchy that has been encoded according to a specific protocol and transport. In the event each object included in the hierarchy may reference, or be referenced by, one or more other objects, a large amount of resources and/or processing time may be consumed by the computing system to construct a multiple-reference object graph from the encoded message. In some instances, computing systems may not have the capabilities to even reconstruct the object graph because of the dependencies between multiple objects in the graph.

SUMMARY OF THE INVENTION

It is therefore desirable to have a method and system that allows a computing system to deserialize an encoded message to reconstruct a serialized object graph that contains multiple-reference objects.

Methods, systems and articles of manufacture consistent with features of the present invention enable a computing system to receive a serialized message including a target object that is associated with at least one member object. The computing system may invoke a deserialize method on a deserializer instance associated with the target object to deserialize the target object. The deserialize method may return a state object when it cannot completely deserialize the target object. The deserializer may configure the returned state object to monitor a deserialization status associated with the at least one member object. Also, the computing system may provide a notification to an instance builder created by the deserializer when the deserialization status reflects that the at least one member object is deserialized.

The instance builder may complete deserialization of the target object based on the notification.

BRIEF DESCRIPTION OF THE DRAWINGS

The accompanying drawings, which are incorporated in and constitute a part of this specification, illustrate several aspects of the invention and together with the description, serve to explain the principles of the invention. In the drawings.

DETAILED DESCRIPTION

Figure 1:
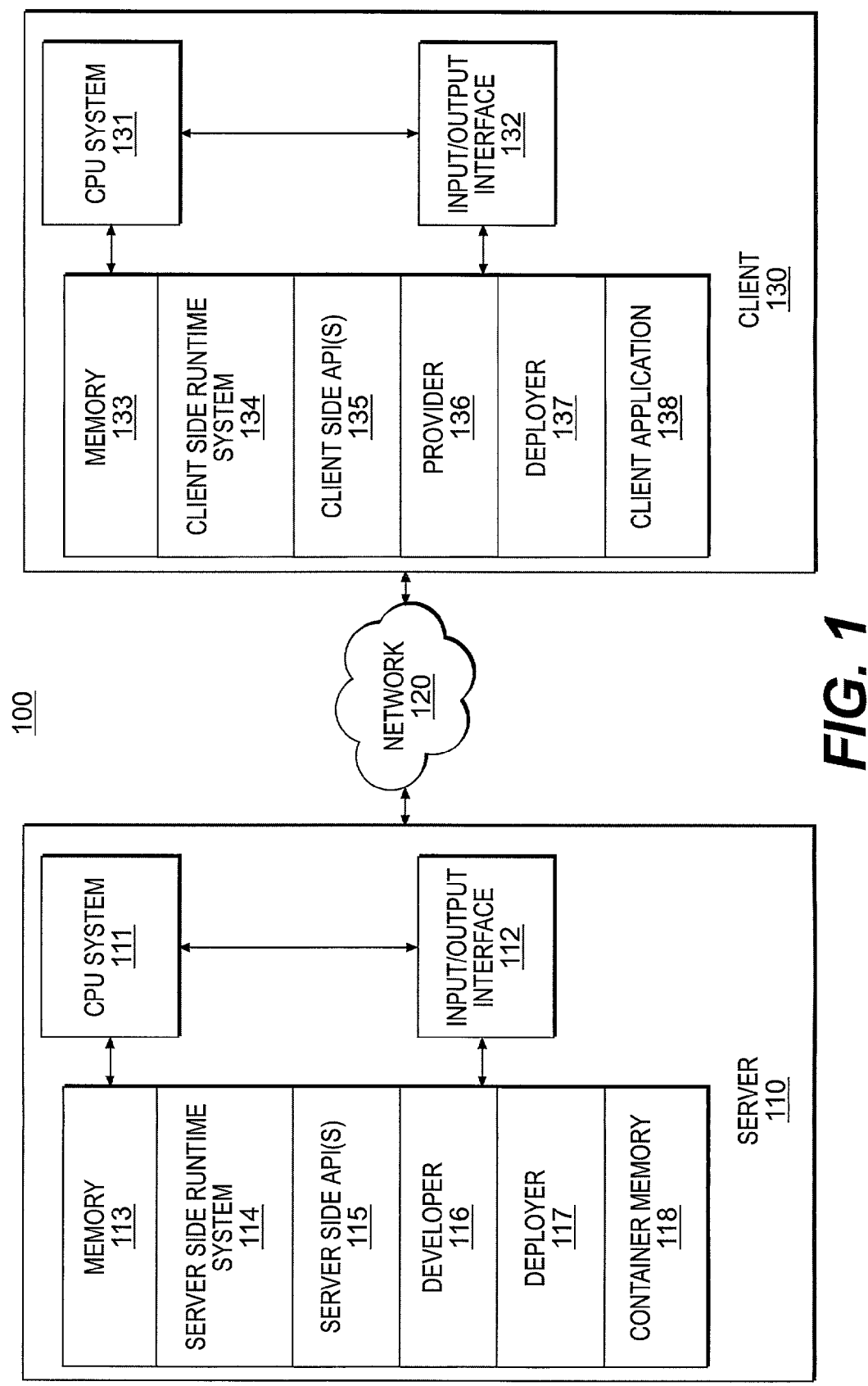
FIG. 1 illustrates an exemplary system environment that may be implemented by methods, systems, and articles of manufacture consistent with certain features related to the present invention.

Methods, systems, and articles of manufacture consistent with features and principles of the present invention enable a computing system to efficiently deserialize objects included in a serialized messaged.

Methods, systems and articles of manufacture consistent with features of the present invention may efficiently deserialize objects by allowing a computing system to receive a message including serialized objects that represent an object graph. The object graph may comprises of root objects that are each referenced by associated member objects. The computing system may invoke a deserialize method on a deserializer instance associated with a target object included in the object graph. The deserialize method may attempt to deserialize the target object, and if successful, return a reference to the deserialized target object. On the other hand, if the target object could not be deserialized, the deserialize method may return a state object reflecting a deserialization state associated with the target object.

Further, the computing system may allow the deserializer to configure the state object returned by the deserialize method to monitor a deserialization status associated with the at least one member object. When the status indicates that the at least one member object has been deserialized, a notification may be provided to an instance builder object, created by the deserializer. In response to the notification, the instance builder may construct and initialize the target object, thus completing deserialization of the target object.

Reference will now be made in detail to the exemplary aspects of the invention, examples of which are illustrated in the accompanying drawings. Wherever possible, the same reference numbers will be used throughout the drawings to refer to the same or like parts.

The above-noted features and other aspects and principles of the present invention may be implemented in various environments. Such environments and related applications may be specially constructed for performing the various processes and operations of the invention or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

The present invention also relates to computer readable media that include program instruction or program code for performing various computer-implemented operations based on the methods and processes of the invention. The program instructions may be those specially designed and constructed for the purposes of the invention, or they may be of the kind well-known and available to those having skill in the computer software arts. Examples of program instructions include for example machine code, such as produced by a compiler, and files containing a high level code that can be executed by the computer using, for example, an interpreter or equivalent execution engine such as an engine that that uses a JIT compiler to facilitate execution of high level code.

System Overview

FIG. 1 illustrates an exemplary system environment 100 in which features and principles consistent with the present invention may be implemented. As shown, environment 100 may include a server 110, network 120 and a client 130. Although server 110 and client 130 are depicted as separate computing nodes, those skilled in the art will appreciate that server 110 and client 130 may be different processes operating on the same node.

Server 110 may define and maintain resources that maybe used by client 130. Similarly, server 110 may reverse roles with client 130 defining and maintaining resources that may be used by server 110. In one aspect consistent with certain principles related to the present invention, server 110 may maintain one or more services, each of which may be a collection of procedures that all callable by remote computing systems, such as client 130. A service may be developed by a user, such as a system developer, operating server 110 using a number of different software developments tools, including tools based on the Java programming language. Further, server 110 may employ Remote Procedure Call (RPC) mechanisms that process calls received from client 130 in a manner consistent with certain features related to the present invention. To use a service maintained by server 110, client 130 may also use RPC mechanisms to access the procedures that define a service.

Network 120 interconnects server 110 and client 130 and may include one or more communication networks, including for example the Internet or any other similar network such as one that supports Web-based processing.

In one configuration consistent with certain features related to the present invention, server 110 and client 130 may implement XML-based RPC mechanisms. These mechanisms may enable client 130 to create a remote procedure call and communicate the call to server 110. Client 130 may obtain and use the service by calling the procedures maintained by server 110. In an XML-based RPC, a remote procedure call may be represented using an XML-based protocol. The "Simple Object Access Protocol" (SOAP) is one such XML-based protocol. SOAP may be used to define an XML-based protocol for exchanging information in a decentralized, distributed environment. SOAP defines a convention for the representation of remote procedure calls and responses. Further description of the SOAP may be found in the SOAP version 1.1 specification, which is hereby incorporated by reference.

Although the following description of server 110 and client 130 are associated with a Java-based XML-based RPC environment, one skilled in the art would realize that system environment may be implemented with non-Java based computing nodes or platforms. For instance, the services defined and deployed by server 110 may be used by service clients deployed on any platform. Further, a Java based service client may be capable of using an XML-based RPC service deployed on a non-Java based platform.

Server 110 may be a desktop computer, workstation, mainframe, or any known server side computing system known in the art. Further, server 110 may be configured in a number of different platforms including, but not limited to, the Java 2 Platform Enterprise Edition (J2EE), the Java 2 Standard Edition (J2SE), and non-Java based platforms. In one configuration consistent with certain features related to the present invention, server 110 may implement programming models associated with Java APIs for XML-based RPC (JAX-RPC). Server 110 may include a CPU system 111, input/output interface 112, memory 113, and numerous other elements and functionalities typical in today's computer systems (not shown).

CPU system 111 may include one or more processors that execute instructions located in memory 113, as well as instructions contained in other memory devices located remote or local to server 110. One skilled in the art would realize that CPU system 111 may include different types of processor architectures without departing from the scope of the invention. For example, CPU system 111 may include co-processing architectures that perform parallel processing, or alternatively, dedicated processors that perform specific tasks.

Input/Output interface 112 may be one or more devices that interface with input and output devices included in server 110, such as a keyboard, mouse, display, printer, network connections, etc. One skilled in the art would realize that server 110 may include a number of different types of input and/or output devices from which input/output interface 112 may provide known interface functionalities without departing from the scope of the invention.

Memory 113 may be any known memory device that stores information. Memory 113 may include software containing instructions executed by CPU system 111 to perform functions consistent with certain features related to the present invention. This software may include, but is not limited to, a server side runtime system 114, server side Application Programming Interface(s) API(s) 115, developer 116, and deployer 117. Further, memory 113 may include memory locations for data, applications, software, etc. that may be used by CPU system 111 in accordance with certain features related to the present invention. For example, memory 113 may include a container memory location 118 for storing servlet based containers.

Server side runtime system 114 may include a JAX-RPC library that provides a set of services that are used for JAX-RPC runtime mechanisms operating within server 110. Server side runtime system 114 may be implemented as a J2SE based JAX-RPC runtime system, a servlet container based JAX-RPC runtime system, or a standard J2EE container (including Enterprise Java Beans (EJB) and Web containers) based JAX-RPC runtime system. A container may be a framework that provides runtime services (example: transaction, security) to the deployed components and dispatches service requests to components included in the container. A container may provide context data (i.e., session state and information about a request) and may facilitate a component's generation of a response. Also, a container may translate requests, such as HTTP requests, to URLs and calls on component instances, such as a servlet, and produces a response based on the content generated by the component. For example, a HTTP request generated by client 130 may be directed to a URL associated with the servlet. The request may cause the container hosting the servlet to call a method, such as a service method, of an instance associated with the servlet's class. The servlet instance may generate content based on the invocation of the service method and the container may return the content to server 110. Server 110 may, through server-side runtime system 114, serve the content to client 130 over network 120.

Server side API 115 may be one or more programming interfaces that enable server side JAX-RPC runtime system 114 to communicate with other software operating in server 110. API 115 may be JAX-RPC APIs that are packaged in a javax.xml.rpc package in accordance with certain features related to the present invention.

Developer 116 may be software that develops a service endpoint associated with a service provided by server 110. Developer 116 may be used by a user operating server 110 to define an RPC service that is available to remote computing systems, such as client 130. Alternatively, developer 116 may define an RPC service autonomously based on instructions provided by a user or other processes operating with server 110.

Deployer 117 may be software that deploys a service on a container maintained by server-side runtime system 114. Deployer 117 may be used by a user operating server 110 to configure and deploy a service defined by developer 116. Alternatively, deployer 117 may configure and deploy a defined service autonomously based on instructions provided by a user or the processes operating in server 110. Each exported service may be described in a Web Services Description Language (WSDL) document that is posted by server 110 and is available to client 130 WDSL is an XML format language for describing network services as a set of endpoints operating on messages containing document-oriented or procedural-oriented information. Further description of the WSDL may be found in the WSDL 1.1 specification by W3C, which is hereby incorporated by reference.

Container memory 118 may be one or more locations in memory 113 that includes servlet containers including servlets and service endpoints that are defined and maintained by server 110. Each service endpoint may include one or more procedures that may be invoked by client 130 remotely over network 120.

Client 130 may be a desktop computer, workstation, laptop, personal digital assistant or any other similar client side system known in the art. Further, client 130 may be configured in a number of different platforms including, but not limited to, the Java 2 Platform Enterprise Edition (J2EE), the Java 2 Standard Edition (J2SE), and non-Java based platforms. In one configuration consistent with certain features related to the present invention, client 130 may be a service client that implements programming models associated with JAX-RPC. Client 130 may use JAX-RPC based mechanisms to generate and communicate calls to server 110 in a manner consistent with certain features related to the present invention.

As shown in FIG. 1, Client 110 may include a CPU system 131, input/output interface 132, and memory 133. CPU system 131 may include one or more processors that execute software located in memory 133, as well as software contained in other memory devices located remote or local to client 130. One skilled in the art would realize that CPU system 131 may include different types of processor architectures without departing from the scope of the invention. For example, CPU system 131 may include co-processing architectures that perform parallel processing, or alternatively, dedicated processors that perform specific tasks.

Input/Output interface 132 may be one or more devices that interface with input and output devices included in server 110, such as a keyboard, mouse, display, printer, network connections, etc. One skilled in the art would realize that server 110 may include a number of different types of input and/or output devices from which input/output interface may provide known interface functionalities without departing from the scope of the invention.

Memory 133 may be any known memory device that stores information. Memory 133 may include software that is executed by CPU system 131 to perform functions consistent with certain features related to the present invention. This software may include, but is not limited to, a client side runtime system 134, client side API 135, provider 136, deployer 137, and client application 138.

Client side runtime system 134 may be a JAX-RPC library that provides a set of services that are used for JAX-RPC runtime mechanisms implemented by client 110. Client side runtime system 134 may be implemented as a J2SE based JAX-RPC runtime system, a servlet container based JAX-RPC runtime system, or a standard J2EE container (including Enterprise Java Beans (EJB) and Web containers) based JAX-RPC runtime system.

Client side API 135 may be one or more programming interfaces that enable client side JAX-RPC runtime system 134 to communicate with other processes operating in client 130. In one aspect consistent with certain features related to the present invention, client API 135 may include a javax.xml.rpc.Stub interface, a javax.xml.rpc.Call interface, a javax.xml.rpc.Service interface, a javax.xml.rpc.ServiceFactory class, and a java.xml.rpc.JAXRPCException class.

Figure 6:
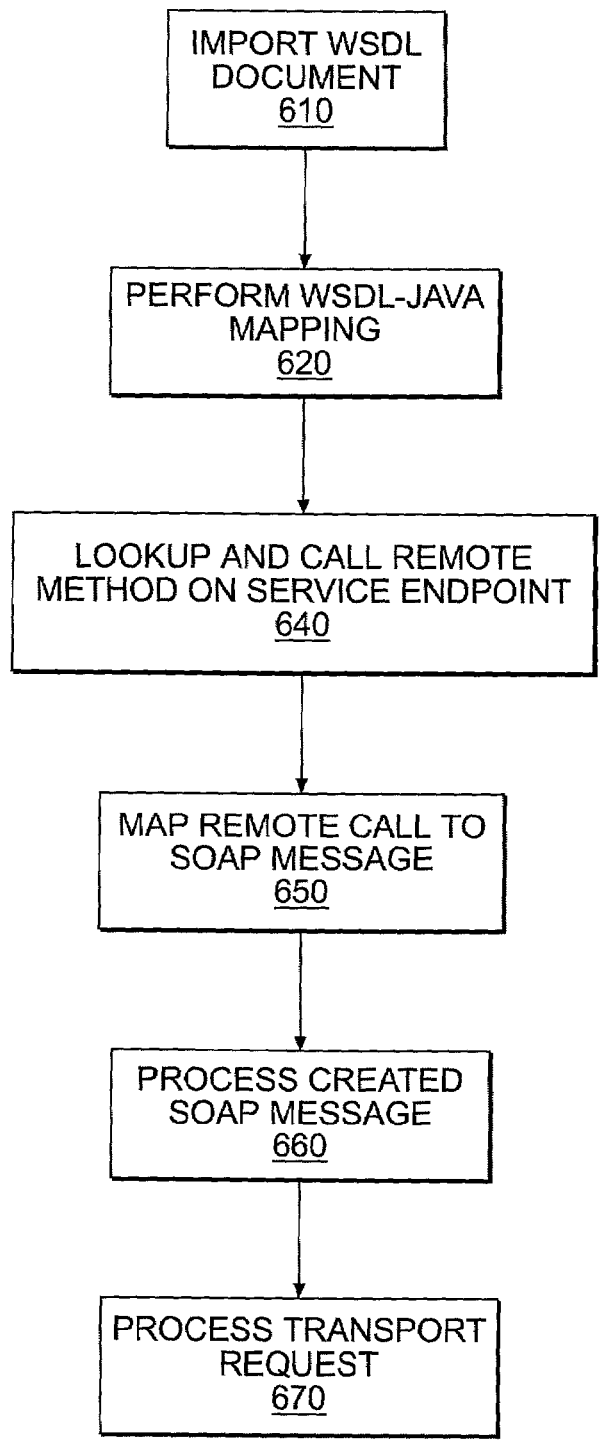
FIG. 6 illustrates a flowchart of an exemplary process of how a stub based client invokes remote methods on a service client consistent with certain features related to the present invention.

The javax.xml.rpc.Stub interface is implemented by stub classes that are generated by a mapping tool operating within client 130. In one aspect of the invention, the mapping tool may be a WSDL-to-Java mapping tool that creates a stub class when client 130 imports a service described in a WSDL document defined by server 130. Alternatively, a stub class may be generated by client 130 through a service endpoint interface and additional information associated with the service definition's protocol binding, which are further explained with respect to the description associated with FIG. 6.

Figure 2:
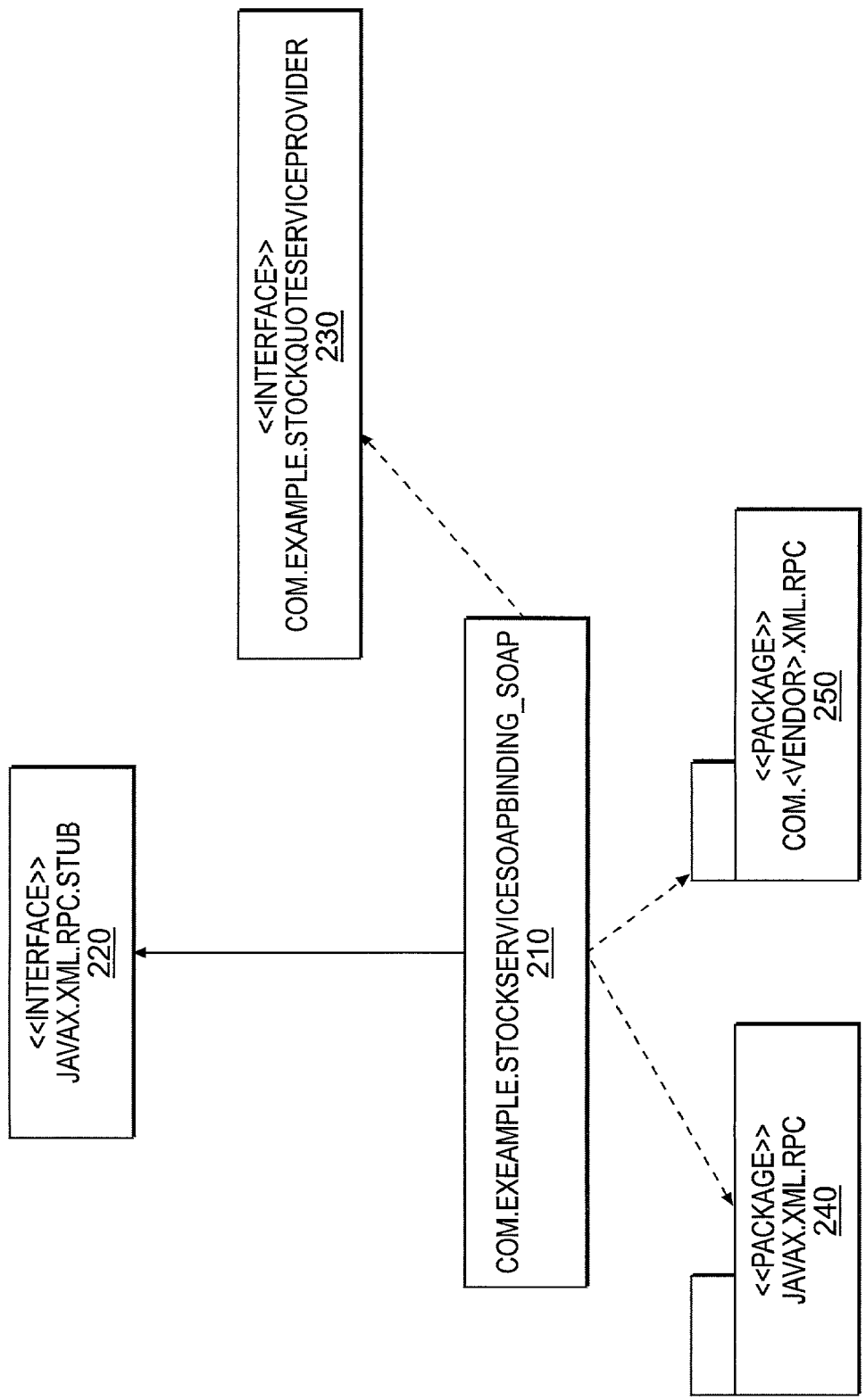
FIG. 2 illustrates an exemplary stub class hierarchy consistent with certain features related to the present invention.

An instance of a stub class may be a client side proxy or stub instance associated with a service endpoint defined by server 110 that client 130 targets for access. A generated stub class may implement a service endpoint interface and may be identified as <BindingName>_Stub. The name of the generated stub class may be derived from a name attribute of a corresponding wsdl:binding element included in an imported WSDL service description, which may be included in a WSDL document that has been defined and exported by server 110. The wsdl:binding element binds an abstract wsdl:portType to a specific protocol and transport that may be used by client 130 to communicate with server 110 over network 120. FIG. 2 illustrates an exemplary stub class hierarchy associated with an exemplary generated stub class called StockServiceSoapBinding_SOAP 210. As shown, the stub class 210 may implement the javax.xml.rpc.Stub interface 220 and a service endpoint interface identified as com.example.StockQuaoteProvider 230. The generated stub class may use the standard java.xml.rpc package 240 and a vendor specific JAX-RPC implementation package 250. For example, the generated stub class may be based on either standard APIs that are specified in the java.xml.rpc package or vendor specific JAX-RPC implementation APIs.

Client 130 may use a stub instance (an instance of, or object instantiated from, a stub class) to invoke a remote method on a service endpoint defined by server 110. A stub instance is a surrogate object that supports exactly the same set of remote interfaces defined by an actual implementation of a remote object. A client may interact with stub objects that have the same set of remote interfaces defined by the class associated with the remote object. Further, the stub class may not include the non-remote portions of a class hierarchy that constitutes the type graph of the object. The stub instance may be configured statically or dynamically. A static configuration of a stub instance is based on a WSDL description of a service endpoint targeted by client 130. For example, a static configuration may include protocol binding specified using wsdl:binding and soap:binding elements included in the WSDL description of the target service endpoint. Also, a stub instance may be dynamically configured using the javax.xml.rpc.Stub interface. This interface may provide extensible property mechanisms for the dynamic configuration of the stub instance. For example, the following code shows an exemplary Stub interface:

```
package javax.xml.rpc;
public interface Stub {
    public void_setProperty(String name, Object value);
    public object_getProperty(String name);
    public java.util.Iterator _getPropertyName( );
}.
```

As previously described, an instance of a stub class may represent a client side proxy or a stub instance for a service endpoint. For a client side proxy, client 130 may utilize a dynamic proxy class that supports a service endpoint interface dynamically at runtime without requiring code generation of a stub class that implements a specific service endpoint interface. The creation of a dynamic proxy may be supported by the getPort method defined in the javax.xml.rpc.Service interface. A serviceEndpointInterface parameter associated with this method may specify the service endpoint interface that is supported by the created dynamic proxy. The dynamic proxy may be used by client 130 to invoke an operation on a target service endpoint defined by server 110.

The java.xml.rpc.Call interface may provide support for the dynamic invocation of an operation on a target service endpoint defined by server 130. This interface may act as a factory for the creation of Call instances. A Call object may be created by client 130 using a createCall method defined in the javax.xml.rpc. Service interface and an internal implementation specific in-memory model of the WSDL description of a service provided by server 110. A portName parameter in the createCall method may identify the service endpoint targeted by client 130. Once a Call instance is created by client 130, various setter and getter methods may be used to configure the Call instance. The configuration of the Call instance may include the name of a specific operation, a port type for the target service endpoint, an address of the target service endpoint, properties specific to the binding to a protocol and transport, name, type, and mode (e.g., IN, INOUT, OUT) of the parameters, and a return type.

The setter methods may throw an exception, such as the java.lang.IllegalArgumentException, if the Call implementation class identifies any illegal parameter values. The specification of the parameters and the return value of a Call instance are supported by a Call implementation class. This class may determine the types of parameters and return value from the invocation of addParameter and setReturnType methods that may be developed by client 130. Further, the Call implementation class may determine the types and modes of the parameters in an implementation specific manner. For example, a Call implementation class may determine parameter types by using Java reflection techniques, a WSDL service description, and a configured type mapping registry. When the Call implementation class determines the types and modes of the parameters in an implementation specific manner, the client 130 may not invoke any addParameter and setReturnType methods before calling an invoke method.

The Call implementation class may also support invocation modes, including a synchronous request-response mode and a one-way mode. In the synchronous request-response mode, the invoke method calls a specified operation using a synchronous request-response interaction mode. The invoke method may take as parameters the object values corresponding to the parameter types configured in the Call instance. The implementation of the invoke method may direct client 130 to check whether passed parameter values match the number, order, and types of parameters specified in a corresponding WSDL specification of the same operation. In the one-way mode, a invokeOneWay method may be implemented by client 130 to invoke a remote method using a one-way interaction mode. In this mode, client 130 may issue a call to server 110 and not wait for a completion of processing by server 110 before continuing with other tasks.

The javax.xml.rpc.ServiceFactory class may be a class that provides a factory for the creation of instances associated with the javax.xml.rpc.Service interface and may be used by client 130 when it is deployed on a J2SE platform. This class may follow an abstract static factor design pattern that enables a J2SE based client to create a Service instance in a portable manner without using a constructor of the Service implementation class.

The javax.xml.rpc.JAXRPCException class included in API(s) 135 may be a class that indicates exceptions related to JAX-RPC runtime mechanisms and may be thrown from client side APIs 135.

Referring back to FIG. 1, provider 136 may be software that may be executed by CPU system 131 that enables client 130 to obtain proxy objects associated with a service endpoint targeted by client 130 for invocation. For example, provider 136 may be used by client 130 to look up a service offered by server 110, get a stub instance for a service endpoint associated with the offered service, and invoke a remote method on the service endpoint.

Deployer 137 may be software that is executed by CPU system 131 that enables client 130 to configure information associated with an address of a target service endpoint. Also, deployer 137 may configure properties associated to a protocol and underlying transport used by client 130 to communicate with server 110. Deployer 137 may be used by client 130 to ensure that the configuration of service and service proxies are based on the protocol binding specified in a WSDL description defined by server 110 and accessed by client 130.

Client application 138 may be software that is developed by a user operating client 130. Client application 138 may be one or more applications, programs, code, etc. that may request resources from server 110 using the RPC mechanisms consistent with certain features related to the present invention. In one aspect of the invention, client application 138 may access WSDL documents that have been exported by server 110 to obtain descriptions of one or more of the services offered by server 110.

Although FIG. 1 shows only one client 130 and server 110, one skilled in the art would realize that computing environment 100 may include a plurality of clients 130 and/or servers 110 without departing from the scope of the present invention. For example, server 110 may define a plurality of service endpoints that that may have methods invoked upon them by a plurality of remote clients, including client 130. Alternatively, client 130 may have access to one or more service endpoints defined in different servers distributed over network 120. Further, environment 100 may include a plurality of servers and clients that are configured to perform the JAX-RPC mechanisms consistent with certain features related to the present invention. Additionally, one skilled in the art would realize that the configuration of client 130 and server 110 described above is not intended to be limiting. That is, server 110 and client 130 may include additional (or less) processes, software, etc., than that shown in FIG. 1 without departing from the scope of the present invention.

Developing and Deploying Service Endpoints

Figure 3:
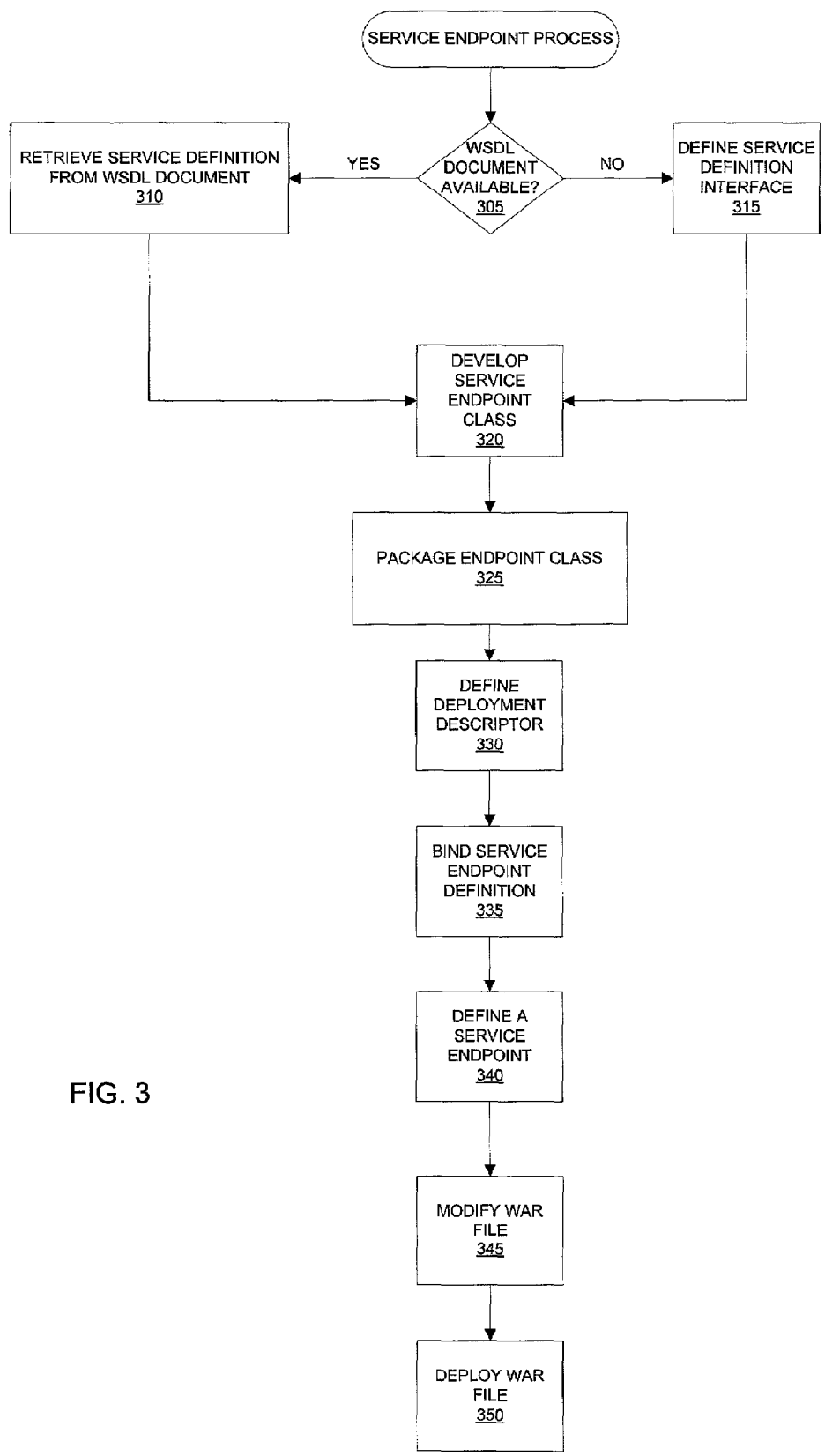
FIG. 3 illustrates a flowchart of an exemplary service endpoint process consistent with certain features related to the present invention.

The configuration of server 110 and client 130 described above may enable JAX-RPC operations to be performed, thus allowing client 130 to invoke methods and/or procedures associated with a service endpoint maintained by server 110. In one aspect consistent with certain features related to the present invention, server 110 may implement a particular component model, such as a standard Servlet or Enterprise Java Bean (EJB) component model. Methods and systems consistent with certain features related to the present invention enable the existing component model implemented by server 110 to be extended to support the development and employment of web service endpoints. FIG. 3 illustrates an flowchart showing an exemplary process server 110 may perform when developing and deploying a servlet based JAX-RPC service endpoint in accordance with certain features related to the present invention. As shown, server 110 may perform a service endpoint definition process by first determining whether there is a WSDL document available to developer 116 (Step 305). An available WSDL document may include a WSDL based description of a previously defined and exported service endpoint associated with a service that server 130 seeks to create. The previously defined and exported service endpoint may have been created by server 110 or by another server connected to network 120.

In the event there is an available WSDL document associated with a service that server 110 wishes to create a service endpoint (Step 305; YES), developer 116 may generate a service endpoint interface from the WSDL document using a WSDL-to-Java mapping tool that may be located in memory 113 or in another memory device remote or local to server 110 (Step 310). The mapping tool may map the WSDL description information included in the WSDL document to a Java package and designate a name for the package that is specific to an application provided by server 110. In one aspect consistent with certain features related to the present invention, the namespace definition in the WSDL document may be mapped to a unique Java package name that may follow the package naming convention defined in the Java Language Specification.

The WSDL-to-Java mapping tool may map a WSDL port type to an interface, such as a Java-based interface, that may be the service endpoint interface which extends the java.rmi.Remote interface. To "extend" an interface means to provide additional functions, code, instructions, features, or capabilities to the interface. In this instance, the service definition may extend the java.rmi.Remote interface by including the interface in its own definition. The WSDL port type is a named set of abstract operations and messages associated with the service described by the WSDL document. The mapping tool may use a wsdl:binding element included in the WSDL document to map a wsdl:portType element to a service endpoint interface. A wsdl:binding element defines a concrete message format and protocol binding for abstract operations, messages, and port types specified in the WSDL document. For example, a wsdl: binding may be a soap:binding that defines a binding for SOAP 1.1 service ports. The name of the service endpoint interface may be mapped from the name attribute of the wsdl:portType element, which may be a unique name among all of the port types defined in the WSDL document. If the mapping tool uses elements of the wsdl:binding to map the service definition, then the name of the service endpoint interface may be mapped from the name of the wsdl:binding element. Also, the wsdl.port element included in the WSDL document may specify an address for a service endpoint (which may be defined and maintained by server 110 or another server connected to network 120) based on the specified protocol binding identified in the wsdl:binding element.

The mapped service endpoint interface may contain methods that are mapped by the WSDL-to-Java mapping tool from the wsdl:operation elements defined in the wsdl:portType element. Each method of the mapped service endpoint interface declares java.rmi.RemoteException in its throws clause. A RemoteException is a common superclass for exceptions related to remote method invocations. For example, the java.rmi.MarshalException, and the java.rmi.ConnectException are common exceptions associated with remote method invocations.

The WSDL-to-Java mapping tool employed by developer 116 may also map a wsdl:operation defined in a wsdl: portType element to a method on the mapped service endpoint interface. This mapping tool may use the wsdl:binding element for mapping the wsdl:operation to a particular Java method. Further, the mapping tool may map the message parts in the wsdl:input and wsdl:output elements defined in an abstract WSDL operation to parameters on a corresponding method's signature.

In one aspect consistent with certain features related to the present invention, the mapping tool may use Holder classes during a WSDL-to-Java mapping process. A Holder class allows the mapping tool to preserve the intended wsdl: operation signature and parameter passing semantics. Holder classes may include classes for the mapping of simple XML data types and xsd:base64Binary, xsd.hexbinary, and soapenc:base64, in a javax.xml.rpc.holders package. For simple XML data types, the name of the Holder class may be the name of the mapped Java type appended with the suffix Holder. One skilled in the art may realize that the naming convention described above are exemplary and not intended to be limiting. For example, in addition mapping simple XML data types, the WSDL-to-Java mapping tool may generate Holder classes for other XML data types. That is, the mapping tool may map complex and extended simple XML data types based on an XML schema specification. For complex XML data types, the name of the Holder class may be constructed by appending Holder to the name of the corresponding Java class. These generated Holder classes may be packages as part of the generated package in the WSDL-to-Java mapping.

Each generated holder class may provide a public field, named value, which is of the same type as the corresponding mapped Java type. Furthermore, each holder class may provide a default constructor that initializes the value field to a default value. The default values for the Java types may be those values specified in the Java Language Specification. Also, each holder class may provide a constructor that sets the value field to a passed parameter.

Furthermore, the mapping tool may map a wsdl:fault element from the WSDL document to either a java.rmi.RemoteException or a service specific Java exception. A service specific Java exception may extend the class java.lang.Exception directly and the name of the Java exception may be based on the name attribute of the wsdl:message corresponding to the wsdl:fault element.

In addition to the above described mapping constructs, the WSDL-to-Java mapping tool may map a wsdl:service element to a service class. A wsdl:service element groups a set of service endpoints with each service endpoint defined with a specific port type, binding, and endpoint address. A service class acts as a factory for a dynamic proxy associated with a service endpoint, an instance of the type javax.xml.rpc.Call for the dynamic invocation of a remote operation on a server endpoint, and an instance of a generated stub class. The service class may implement a javax.xml.rpc.Service interface directly or an interface that is generated during the WSDL-to-Java mapping. The generated interface may extend a base interface, such as a java.xml.rpc.Service interface. One skilled in the art will recognize that the above descriptions of the element mappings are exemplary and are not intended to be limiting. That is, based on the specifications implemented by systems and methods consistent with certain features of the present invention, such as various versions of the WSDL, XML, and Java Language Specifications, computing environment 100 may perform the WSDL-to-Java mapping processes using different fields, elements, and data types without departing from the scope of the present invention.

Returning to FIG. 3, in the event a WSDL document is not available for developer 116 (Step 305; NO), developer 116 may define a service endpoint interface (Step 315). This defined service endpoint interface extends the java.rmi.Remote interface either directly or indirectly. Further, each method included in the service endpoint interface throws java.rmi.RemoteException and specific exceptions based on detected illegal operations. The parameters and return types of each method may be JAX-RPC supported Java types and at runtime, the values of the supported Java type may be serializable to and from a corresponding XML representation. The following code reflects an exemplary service definition interface that may be defined by developer 116:

```
// Java
package com.example;
public interface StockQuoteProvider extends java.rmi.Remote {
    public float getLastTradePrice (String tickerSymbol)
        throws java.rmi.RemoteException,
            com.example.InvalidTickerSymbolException
    public StockQuoteInfo getStockQuote (String tickerSymbol)
        throws java.rmi.RemoteException,
            com.example.InvalidTickerSymbolException;
}.
```

The above exemplary service endpoint interface shows the extension of the java.rmi.Remote interface as well as the use of java.rmi.RemoteException. As mentioned above, a service endpoint interface may also declare service specific exceptions in a method signature in addition to the java.rmi.RemoteException. The service specific exception declared in a remote method signature may be checked, however it may not be associated with a java.lang.RuntimeException. This type of exception may be thrown during runtime of a RPC operation. The following code shows an exemplary service endpoint interface that uses a service specific Java exception:

```
// Java
package com.example;
public interface StockQuoteProvider extends java.rmi.Remote {
    public float getLastTradePrice (String tickerSymbol)
        throws RemoteException, com.example.InvalidTickerSymbolException;
    // . . .
}
public class InvalidTickerSymbolException extends java.lang.Exception {
    public InvalidTickerSymbol (String tickerSymbol) { . . . }
    public String getTickerSymbol ( ) { . . . }
}.
```

Once a service endpoint interface is either retrieved from a WSDL document (Step 310) or defined (Step 315), developer 116 may develop a service endpoint class (Step 320). The service endpoint class may be developed such that it implements the service endpoint interface. Also, the service endpoint class may implement a ServiceLifecycle interface. Further, the service endpoint class may use a javax.servlet.ServletEndpointContext interface to access the context for this endpoint maintained by server 110. The service endpoint class may get the ServletEndpointContext through a ServiceLifecycle.init method associated with the ServiceLifecycle interface. The service endpoint class may obtain references to resources and enterprise beans by using the Java Naming and Directory Interface (JDNI) to lookup these resources. Alternatively, deployment elements (e.g., env-entry, ejb-ref, ejb-local-ref, resource-ref, and resource-env-ref) may be specified in a web application deployment descriptor that may be available to the service endpoint class.

In the event the service endpoint class implements the ServiceLifecycle interface, server side runtime system 114, which may be a servlet container based JAX-RPC runtime system, may manage the lifecycle of the service endpoint corresponding to the service endpoint class. The lifecycle of a servlet based JAX-RPC service endpoint may be defined to be the same as that of a servlet. For instance, after a service endpoint object, which is an instance of a service endpoint class, is instantiated by server 110, server side runtime system 114 may initialize the service endpoint object by invoking the init method. This method carries the ServletEndpointContext for a servlet based endpoint. The service endpoint class may use the init method to initialize its configuration and setup access to any external resources. The ServletEndpointContext passed in the init method may provide the endpoint context information (includes HTTP session, servlet context, user principal and SOAP message context) for the initialization of the endpoint. Once the service endpoint has been initialized, server side runtime system 114 may dispatch multiple remote method invocations to the service endpoint object. These method invocations may correspond to the remote methods included in the service endpoint interface implemented by the service endpoint class. The server side runtime system 114 may end the lifecycle of a service endpoint object by invoking the destroy method. The service endpoint may release any resources it has been allocated and cleanup any memory locations associated with the allocation when the destroy method is implemented.

Once the service endpoint class is created, developer 116 may package the service endpoint interface and one or more endpoint classes (Step 325). In one aspect consistent with certain principles related to the present invention, developer 116 may create and configure a package such as a Web Application Archive (WAR) file. A WAR file is similar to a Java ARchive (JAR) file used for Java class libraries. The packaged WAR file may specify a contract between a service developer and deployer 117. The service developer may be a user, business entity, or similar types of entity, that requests and develops a service (using developer 116). Deployer 117 may be software that is provided by a service deployer, such as a business entity, and may be used by the service deployer to develop a service that may be available to clients connected to network 120, such as client 130. The WAR file may be developed and stored in memory 111 accessible by at least developer 116 and deployer 117.

In one aspect consistent with certain features related to the present invention, a service developer, through developer 116, may package specific information within the WAR file, including, but not limited to, one or more service endpoint interfaces, one or more service endpoint classes, programming artifacts, such as resources required by the service endpoint classes (e.g., images, XML documents, references to EJBs, serializers, deserializers, etc.), and a WSDL document that describes the service endpoints. Further, the developer 116 may package service specific servlets as part of the packaged WAR file. These servlets, however, may be different from linked servlet classes provided by the deployer 117 during deployment, which is described below.

Developer 116 may also define a deployment descriptor that defines the components included in the packaged WAR file and how they are used (Step 330). The deployment descriptor may also be packaged within the WAR file. The deployment descriptor specifies deployment information about a service endpoint and may be packaged based on the standard Servlet specification within the WAR file. The deployment descriptor may include, for each service endpoint included in the WAR file, the following elements: display-name, description, service-endpoint-name, service-endpoint-interface, service endpoint-class, wsdl-document-location, binding-name, and type-mapping.

The display-name element may specify a name for the service endpoint definition that may be intended to be displayed by deployer 117. The description element may include any information that a service developer may provide to deployer 117, and may also be displayed by deployer 117. The service-endpoint-name element may specify the name of the corresponding service endpoint definition. The name may be unique among all service endpoint definitions specified in the same WAR file. The service-endpoint-interface element may specify the fully qualified Java name of the corresponding service endpoint interface, while the service endpoint-class element may specify the fully qualified Java name of the service endpoint class that implements the service endpoint interface. The wsdl-document-location element may specify the location (using, for example, a reference such as a Uniform Resource Locator (URL)) of a WSDL document that contains a WSDL description of the corresponding service endpoint definition. The service developer, through developer 116, may use the WSDL document to provide additional deployment information, such as protocol binding, endpoint address, etc., to deployer 117. The binding-name element may specify the qualified name of a protocol binding that may be used for the corresponding service definition. This element may be provided within the WSDL document, which may be found in the location designated by the wsdl-document-location element. In one aspect consistent with certain features related to the present invention, the protocol bound to may be the SOAP protocol. Last, the type-mapping element may specify the requirements for pluggable serializers and deserializers that may be used by server 110 and client 130 to send and receive messages over network 120. Serializers and Deserializers are further described below in the section entitled "Serialization Framework."

A service developer, through developer 116, may use a web application deployment descriptor to specify additional deployment information for a service endpoint. For example, the service developer may use the ejb-local-ref element to define a reference to a local stateless session bean from the service endpoint class.

One skilled in the art will recognize that the packaging and deployment descriptor defining processes (e.g., Steps 325 and 330) are performed independent of the component model implemented by server 110. For example, if server 110 implements a Servlet component model like that described in the Java Servlet Specification Version 2.3 which is incorporated herein by reference in its entirety, the packaging and defining processes described with respect to Steps 325 and 330 may be layered on top of the implemented model. Therefore, service endpoints can be defined, packaged and deployed to a JAX-RPC based archive file independent of any component model, such as a standard Servlet component model and an EJB component model.

Once the service endpoints have been packaged in the WAR file, deployer 117 may process the WAR file for deployment to a servlet-based archive file. Based on the deployment descriptor and packaged information included in the WAR file, deployer 117 may define and configure a protocol binding that binds a service endpoint definition included in the WAR file to a concrete protocol and transport, such as SOAP 1.1 protocol over a HTTP transport (Step 335). Deployer 117 may specify any number of protocol bindings for single service endpoint definition. These protocol bindings may be supported by a servlet container associated with the service endpoint definition and provided by server side runtime system 114. Additionally, deployer 117 may use the WSDL description of the service endpoint definition that is provided by the service developer using the wsdl-document-location and binding-name elements included in the WAR file to identify the protocol binding and other WSDL specific elements. Deployer 117 may be configured to override the WSDL specific protocol binding and other elements if needed. Further, if the service developer did not specify any protocol binding in the WSDL document, then deployer 117 may provide the necessary information for the definition of a protocol binding for the service endpoint definition.

In addition to defining and configuring the protocol binding for a service endpoint definition, deployer 117 may also configure and define a service endpoint (Step 340). Deployer 117 may define a service endpoint by assigning a unique endpoint address for a service endpoint definition. This address may correspond to the transport identified in the protocol binding for the service endpoint definition. For example, the endpoint address {http://example.com/stockquote/} may be an address for an HTTP transport.

Additionally, to define a service endpoint, deployer 117 may link a servlet class with the service endpoint class included in the WAR file. The linked servlet class may correspond to the configured transport binding for a specific service endpoint. For example, the class javax.servlet.http.HttpServlet may be used for an HTTP transport. Further, deployer 117 may assemble the servlet classes as part of the WAR file with the service endpoint classes.

In addition to providing linked servlet classes, deployer 117 may produce a complete WSDL based description of each service endpoint that is defined and configured. This WSDL description may be added to a final WSDL document generated by deployer 117 that describes a service. The WSDL document provided by the service developer, identified by the wsdl-document-location element for a corresponding service endpoint definition, may include information that deployer 117 may use to construct the final WSDL document that may be generated and exported during deployment of a service endpoint.

Once the deployer 117 defines a service endpoint and protocol binding, it may convert the packaged WAR file to a Servlet based WAR file (or any other type of archive file that is supported by the component model implemented by server 110). To do so, deployer 117 may modify the WAR file with additional information and classes previously produced by the service developer through developer 116 (Step 345). Deployer 117 may add to the WAR file servlet classes linked with corresponding service endpoint classes, a standard servlet deployment descriptor, such asweb.xml described in the Java Servlet Specification, that specifies deployment information for the servlet classes used for the definition of service endpoints, and a JAR file that packages the classes for the server-side runtime system 114. Alternatively, these classes may be configured in the operational environment of the servlet container associated with a defined service endpoint. Once the modified WAR file is assembled, deployer 117 may deploy it on a servlet container located in server-side runtime system 114 (Step 350).

Deployer 117 may also export the service endpoint as a WSDL document that includes the WSDL description of the service. The WSDL document may be exported and published in a Universal Description, Discovery, and Integration (UDDI) registry. Such a registry allows entities to share information about services provided by entities. For example, an entity may use the UDDI Business Registry at a business level to determine whether other entities provide particular service interfaces and how to interact with the interface. More information on UDDI may be found in "UDDI Technical White Paper," Ariba, Inc., IBM, and Microsoft, Sep. 6, 2000, which is hereby incorporated by reference. The WSDL description includes information that client 130, or any client deployed on any platform, may use to access the service and its corresponding endpoints defined by server 110. Deployer 117 may implement a Java-to-WSDL mapping tool to map a service endpoint interface to a service description in a WSDL document. The Java-to-WSDL mapping tool may specify a definition of a JAX-RPC package supported Java Type, specify a service endpoint interface for a JAX-RPC service, map a Java service definition to WSDL definitions, and map the Java types to XML data types.

The service definition may be mapped by the Java-to-WSDL mapping tool to a WSDL service description, which may include abstract definitions, such as wsdl:types, wsdl:message, wsdl:operation, and wsdl:portType. Each Java identifier included in the service definition may be mapped to an equivalent XML name, while a Java package is mapped to a WSDL document. The mapped WSDL document may contain abstract definitions (e.g., port type, operations, messages, etc.) based on the mapping of Java declarations in the corresponding Java package. The namespace definitions in the WSDL document created may be mapped in an application specific manner. Alternatively, the Java-to-WSDL mapping tool may map WSDL definitions into multiple WSDL documents that may be imported across several documents.

The Java-to-WSDL mapping tool may map the service endpoint interface, which extends the java.rmi.Remote interface, to the wsdl:portType element. The name attribute of this element may be the same as the service endpoint interface. Further, methods defined in the service endpoint interface may be mapped to the wsdl operation definitions in the corresponding wsdl:portType element.

For example, the following service endpoint interface,

```
// Java
package com.example;
public interface StockQuoteProvider extends java.rmi.Remote {
    public float getLastTradePrice (String tickerSymbol)
        throws java.rmi.RemoteException;
},
``` may be mapped to the following wsdl:portType definition,

```
// WSDL
<portType name="StockQuoteProvider">
    <operation name="getLastTradePrice"
        parameterOrder="tickerSymbol">
        <input message="tns:GetLastTradePriceInput"/>
        <output message="tns:GetLastTradePriceOutput"/>
    </operation>
</portType>.
```

Additionally, each Java interface included in the service endpoint inheritance hierarchy may be mapped to an equivalent wsdl:portType definition. Each wsdl:portType definition may include mapping of the complete set of inherited Java methods. For example, service endpoint interfaces StockQuoteProvider and PremiumStockQuoteProvider may be mapped to respective wsdl:portType definitions. The port type StockQuoteProvider may include a single operation getLastTradePrice, while the port type PremiumStockQuoteProvider may include two operations, getLastTradePrice and getRealtimeLastTradePrice. The getLastTradePrice operation may be mapped from a corresponding inherited method. The following code illustrates the above example.

```
// Java
package com.example;
public interface StockQuoteProvider extends java.rmi.Remote {
    // gets a 20 minute delayed stock price
    public float getLastTradePrice (String tickerSymbol)
        throws java.rmi.RemoteException;
}
package com.example;
```

-continued

```
public interface PremiumStockQuoteProvider extends
        com.example.StockQuoteProvider {
    //gets a realtime stock quote
    public float getRealtimeLastTradePrice (String tickerSymbol)
        throws java.rmi.RemoteException;
}.
```

The above two service endpoint interfaces may be mapped to corresponding wsdl:portType elements as follows:

```
// WSDL
<portType name="StockQuoteProvider">
    <operation name="getLastTradePrice"
        parameterOrder="tickerSymbol">
        <input message="tna:GetLastTradePriceInput"/>
        <output message="tns:GetLastTradePriceOutput"/>
    </operation>
</portType>
// WSDL
<portType name="PremiumStockQuoteProvider">
    <operation name="getLastTradePrice"
        parameterOrder="tickerSymbol">
        <input message="tns:GetLastTradePriceInput"/>
        <output message="tns:GetLastTradePriceOutput"/>
    </operation>
    <operation name="getRealtimeLastTradePrice"
        parameterOrder="tickerSymbol">
        <input message="tns:GetRealtimeLastTradePriceInput"/>
        <output message="tns:GetRealtimeLastTradePriceOutput"/>
    </operation>
</portType>.
```

The Java-to-WSDL mapping tool maps each method in a service endpoint interface to an equivalent wsdl:operation definition. The mapped wsdl:operation definition may preserve the parameter ordering of the method signature. When mapping a method, the Java-to-WSDL mapping tool may define the name of the mapped wsdl:operation as the same name as the method.

In accordance with one aspect consistent with certain features related to the present invention, the Java-to-WSDL mapping tool may ensure that a mapped wsdl:operation contains wsdl:input, wsdl:output and an optional wsdl:fault element based on the mapping of the method's signature. The message attribute of the wsdl:input and wsdl:output elements may use the qualified names of the corresponding wsdl:message definition. Furthermore, each parameter in a method's signature may be mapped to a message part in a corresponding wsdl:message element. Each message part may have a name attribute that is mapped based on the name of the method's parameter and a type attribute (e.g., an XML data type) mapped from the Java type of the parameter. Message parts may be arranged in the same order as in the method signature.

Additionally, the Java-to-WSDL mapping tool may map a Java return type for a Java method to a message part in the wsdl:message element. This element may correspond to the wsdl:output element for a mapped wsdl:operation. The ordering of parameters may be represented in the parameterOrder attribute included in the wsdl:operation element. The message part for a return value may not be listed in the parameterOrder attribute. Each service specific exception in a remote method signature may be mapped to a wsdl:fault element. The name attribute of the wsdl:fault element may be based on the name of the exception. The message attribute of the wsdl:fault element may be the qualified name of the wsdl:message definition. And, a remote exception, such as the java.rmi.RemoteException or one of its subclasses, may be mapped to a standard wsdl:fault element.

Figure 4:
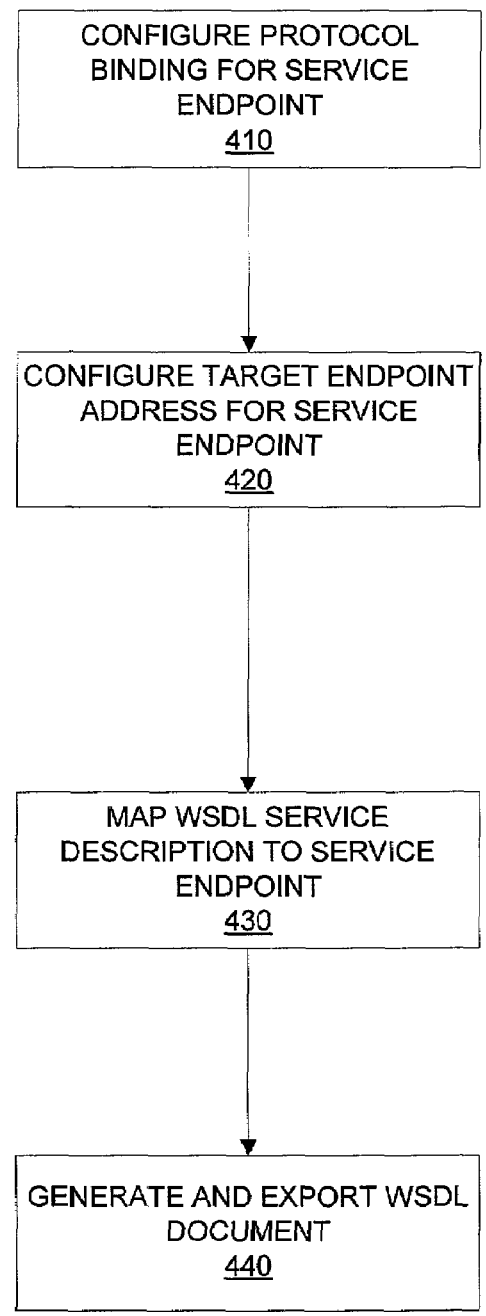
FIG. 4 illustrates a flowchart of an exemplary J2SE based service endpoint process consistent with certain features related to the present invention.

Although the above description of FIG. 3 is associated with a servlet-based service endpoint model, methods, systems, and articles of manufacture consistent with certain features related to the present invention may also implement the service endpoint process for a JAX-RPC service developed and deployed on a J2SE-based platform. In this configuration, a separate deployment process for a J2SE-based service endpoint definition may not be provided. Instead a J2SE-based server 110 may perform the process illustrated in FIG. 4. The process may include configuring the protocol binding for a service endpoint (Step 410). This configuration may specific to the underlying protocol and transport that the server may use to communicate with client 130. Also, the J2SE-based server 110 may configure the target endpoint address for a service endpoint (Step 420) and map an equivalent WSDL based service description to the service endpoint (Step 430). Last, a WSDL document including the WSDL description may be generated and exported by publishing the document in a UDDI registry in a manner similarly described above. (Step 440). In a J2SE configuration, a service developer may provide a J2SE-based implementation class, identified as a service endpoint class, for a service endpoint interface.

Soap Binding

Methods, systems, and articles of manufacture consistent with certain features related to the present invention may bind WSDL elements to a protocol that may be used to encode the WSDL element for transport to a target computing system. For example, the soap:binding element described in the WSDL specification may identify that the SOAP protocol may be used for binding abstract WSDL definitions. Both server 110 and client 130 may implement processes that support operation modes for SOAP binding. These operations modes may include an operation with an rpc style and encoded use, an operation with a document style and literal use, and an operation with the document style and the encoded use.

The style attribute specified in a soap:operation element, or as a default in the soap:binding element, may indicate whether an operation is rpc or document oriented. In one aspect consistent with certain features related to the present invention, both the rpc and document style operations may be mapped to corresponding remote methods on a service endpoint interface. The services defined and deployed on server-side runtime system 114 and exported to a corresponding WSDL document may be represented in various manners. In one manner, the JAX-RPC processes implemented by server 110 may support the default representations of the SOAP Body element for both document and rpc style operations. These representations may include a representation that all message parts, such as a parameter or return value, appear inside a single wrapper element, which may be the first child element of the SOAP Body element.

The wrapper element for a request may have a name identical to the unique operation name associated with a request message. The name of the wrapper element for a request may be used by server 110 to resolve a method on a target service endpoint. Further, the representation may ensure that each message part has an accessor with a name corresponding to the name of the parameter and type corresponding to the type of the parameter. Message parts may be arranged in the same order as the parameters associated with a remote call. The SOAP 1.1 specification further describes the details associated with the representation of RPC invocations and responses in a SOAP Body element.

As mentioned above, the JAX-RPC-based processes implemented by server 110 and client 130 may support both rpc and document style operations with the encoded use. In the encoded use, each message part in the SOAP body references an abstract type using the type attribute. These types are serialized according to the encodings identified in the encodingStyle attribute of the soap:body element of a WSDL document.

For the document style for literal use operation mode, the literal use may be defined on the soap:body element in the WSDL document. If a use is literal, each message part in the SOAP Body element may reference a concrete schema definition using either the element or type attribute. If the element attribute is used, the element referenced by the message part may appear under the Body element. If the type attribute is used, the type referenced by the part may become the schema type of the enclosing element (e.g., Body element for the document style or part accessor element for the rpc style). The JAX-RPC processes implemented by server 110 and 130 may support the element attribute in a message part with literal representation. Further, the encodingStyle attribute to apply specific encoding rules.

Runtime Operation

Accordingly, deployer 117 may employ the Java-to-WSDL mapping tool to create a WSDL document with a corresponding WSDL description of a service endpoint. The deployer 117 may export the WSDL document to a location that is accessible by remote clients, including client 130. Client 130 may use the WSDL description to configure a remote procedure call directed to server 110 in order to invoke methods from a service endpoint associated with the WSDL document. The following section describes an exemplary process associated with a runtime operation of system environment 100 in accordance with certain features related to the present invention.

Figure 5:
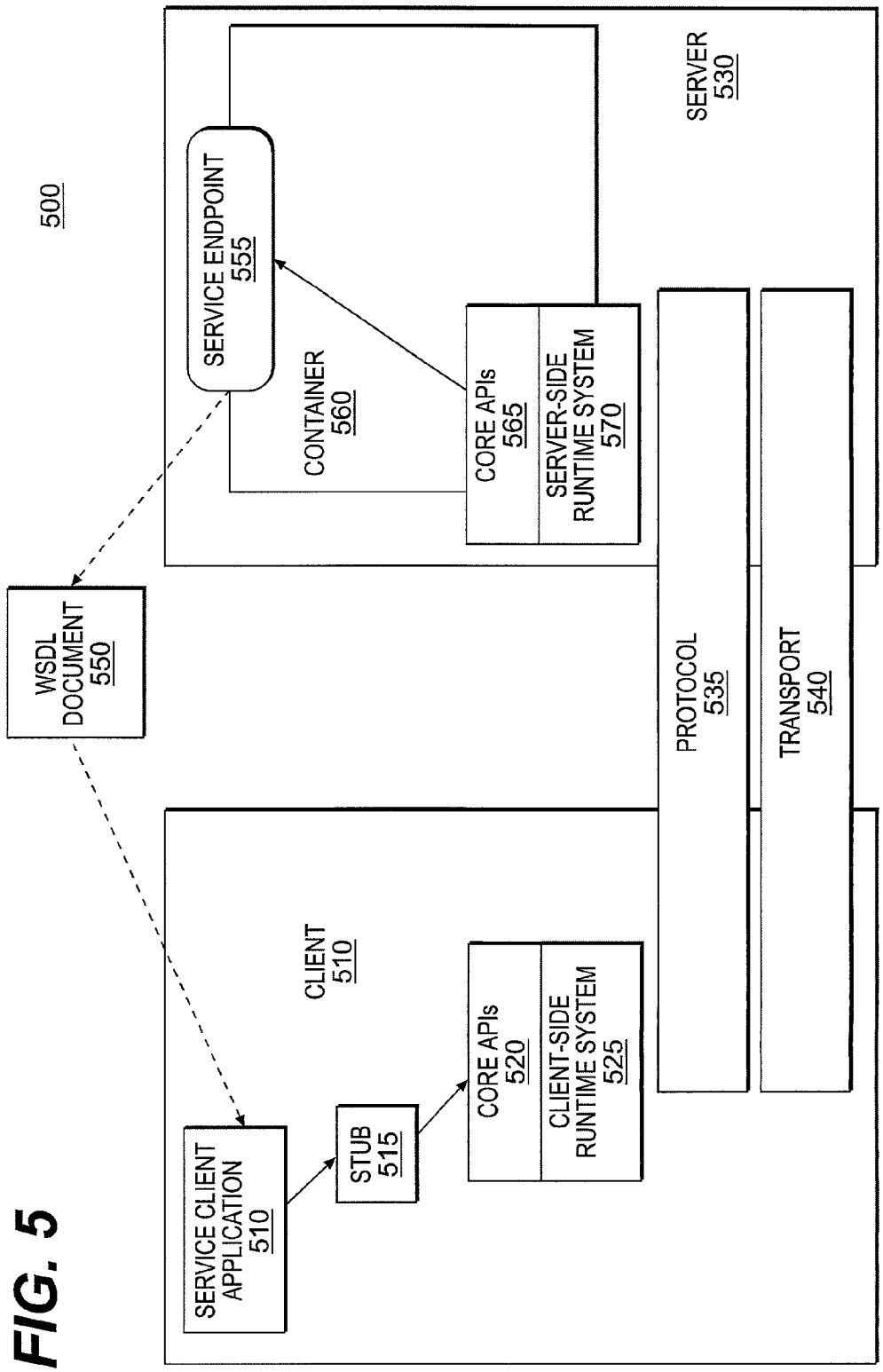
FIG. 5 illustrates a block diagram of an exemplary model environment consistent with certain features related to the present invention.

Once a service endpoint has been defined and exported in a corresponding WSDL document, the endpoint may be used by client 130. FIG. 5 shows a block diagram of an exemplary model environment 500 including elements associated with a runtime operation consistent with certain features related to the present invention. As shown, model environment 500 includes representations of various elements described above with respect to FIG. 1. Model environment 500 will be described in correlation with the following description of FIG. 6, which illustrates a flowchart of an exemplary process of how a stub based client 510 invokes remote methods on service endpoint 555 in accordance with certain features related to the present invention.

Initially, client 510 may request the use of a particular service that is provided by server 530. To use the service, client 5 may locate WSDL document 550 corresponding to the target service that has been exported by server 530. Client 510 may locate the WSDL document from a UDDI registry where the document may have been exported by server 530, as previously described respect to FIG. 3.

Once the WSDL document 550 corresponding to the target service is located, the document may be imported by client 510 (Step 610). In one aspect consistent with certain features related to the present invention, client 510 may locate the WSDL document using standard UDDI techniques and processes, such as an inquiry API for locating candidate services from a UDDI registry. One skilled in the art will recognize that client 510 may implement a number of different techniques and procedures to locate and obtain the WSDL document exported by server 530 without departing from the scope of the invention. Once imported, the WSDL document may be processed by a WSDL-to-Java mapping tool executing in client 130 that generates client side artifacts, such as, stub classes, a service endpoint interface, and additional classes associated with the service and its service endpoints (Step 620). The WSDL-to-Java mapping tool operating within client 130 may perform the mapping operations performed by server 110 described above with respect to FIG. 3, Step 310. As previously mentioned, in addition to mapping WSDL port types, and its elements, the WSDL-to-Java mapping tool may map a wsdl:service element to a service class. The service class may be a factory for a dynamic proxy for service endpoint 555, an instance of the type javax.xml.rpc.Call for the dynamic invocation of a remote operation on service endpoint 555, and an instance of a generated stub class. The service class may implement a base service interface, such as javax.xml.rpc.Service. The following code is an exemplary base service interface, javax.xml.rpc.Service, that may be implemented by methods, systems, and articles of manufacture consistent with certain features related to the present invention.

```
package javax.xml.rpc;
public interface Service {
    public java.rmi.Remote getPort (QName portName,
                    Class serviceEndpointInterface)
            throws JAXRPCException
    public java.rmi.Remote getPort (class serviceEndpointInterface)
            throws JAXRPCException;
    public Call createCall ( ) throws JAXRPCException;
    public Call createCall (QName portName) throws JACRPCException;
    public Call createCall (Qname portName, String operationName)
            throws JAXRPCException;
    public java.net.URL getWSDLDocumentLocation( );
    public QName getServiceName( );
    public java.util.Iterator getPorts( );
}.
```

Client 530, which represents client 130, may be configured to provide an implementation class for the base service interface. This class may support the creation of both dynamic proxies and Call objects. As shown in the above exemplary code, the base interface may include a method (e.g., getPort (QName, Class)) that returns a dynamic proxy for a specified service endpoint 555. Client 530 may use the dynamic proxy to invoke operations on service endpoint 555. A parameter of this method (e.g., serviceEndpointInterface) may specify the service endpoint interface that is supported by the created dynamic proxy. The service interface may also include another method (e.g., getPort (Class)) that may return either an instance of a generated stub implementation class or a dynamic proxy. A parameter of the method (e.g., serviceEndpointInterface) may specify the service endpoint interface that may be supported by the returned stub or proxy. The client side runtime system (e.g., 134) for client 530 may select a protocol binding (and a port) when implementing the getPort (Class) method and configure the generated stub instance accordingly. The getPorts method included in the above exemplary service interface may return a list of qualified names of one or more endpoints, including endpoint 555, grouped by a target service. Further, the multiple variants of the method createCall included in the exemplary service interface may create instances of the javax.xml.rpc.Call interface.

In addition to implementing a base service interface, the WSDL-to-Java mapping tool implemented by client 510 may also generate a service interface based on the mapping of a wsdl:service element included in the WSDL document 550. The generated service interface may extend the base service interface and may be used to create instances of a generated stub class. Client 510 may be configured to generate the implementation class for a generated service interface.

Once the WSDL-to-Java mapping tool has generated the appropriate client side artifacts, such as a stub class (e.g., stub 515), client side runtime system 525 may look up and invoke a remote method on service endpoint 555 (Step 640). Client-side runtime system 525 may use core APIs 520, which may correspond to client-side API(s) 135 shown in FIG. 1) to use stub 515 to invoke a remote method on service endpoint 555. Provider 136, shown in FIG. 1, may be used by client 510 to reference a service endpoint 555 provided by server 530. Provider 136 may reference the service by using a logical name called service reference. Provider 136 may use the service reference to get access to a service port associated with endpoint 555 by assigning an entry in client 510's environment to the service reference. Provider 136 may declare the service references in the deployment descriptor using a service-ref element, which may contain a description element, a service ref-name element, a service-ref-type element, and a type mapping element. The description element describes the referenced service. The service-ref-name element identifies the name of the logical reference used in the component code. Service-ref-type element indicates the fully qualified name of the service class returned by a JNDI lookup. And, the type mapping element may specify the requirements for serializers and deserializers that may be plugged in by client 510 and used for sending and receiving data, respectively, to server 530.

Provider 136 may also lookup an instance of the service class mapped from the wsdl:service element included in the WSDL document 550. The lookup performed by provider 136 may be performed using the JNDI namespace. Provider 136 may use one or more methods on the looked up service instance to get one or more proxy objects for service endpoint 555. The proxy for endpoint 555 may be a dynamic proxy or an instance of a generated stub class. The stub class instance may implement the service endpoint interface included in the WSDL document 550. The following program code illustrates how provider 136 may look up a service, get a stub instance for a service endpoint, and invoke a remote method on the service endpoint.

```
Context ctx = new InitializationContext( )
com.example.StockQuoteService sqs =
    ctx.lookup("java:comp/env/StockQuoteService");
com.example.StockQuoteProvider sqp =
    sqs.getStockQuoteProviderPort( );
float quoteprice = sqp.getLastTradePrice("ACME");
```

Alternatively, provider 136 may create a dynamic proxy when looking up a service to invoke a remote method on a service endpoint. The following code represents exemplary code that provider 136 may use to create a dynamic proxy.

```
Context ctx = new InitializationContext( )
javax.xml.rpc.Service sqs = ctx.lookup (
        "java:comp/env/DynamicService");
com.example.StockQuoteProvider sqp =
    (com.example.StockQuoteProvider)sqs.getPort(
        portName,
        StockQuoteProvider.class);
float quotePrice = sqp.getLastTradePrice("ACME");.
```

In addition to tasks performed by provider 136, client 510 may incorporate the use of deployer 137 to configure the service instance and proxies created by provider 136. For example, deployer 137 may link a service reference to an actual representation and configuration of a corresponding service. This linking may be specific to the implementation of a container. For example, deployer 137 may link the logical service reference to the imported WSDL-based description of the service included in the WSDL document 550. Deployer 137 may also provide and configure information for the service instance and service endpoint proxies. For example, the configuration information may include the endpoint address for service endpoint 555, properties specific to a protocol 535 and underlying transport 540 that may be used by client 510 to communicate with server 530, security information, and type mapping registry information. Deployer 137 may ensure that the configuration of a service and service proxy is based on the protocol binding specified in the WSDL description of the service included in the imported WSDL document 550. For example, the configuration of the stub instance may be that as previously described with respect to the client side API(s) 135.

Methods, systems, and articles of manufacture consistent with certain features related to the present invention may allow client 510 to use various other approaches for invoking a remote service endpoint. For example, in the event the client 510 was deployed on a J2SE-based platform, client 510 may use the generated stub classes to invoke a method on service endpoint 555. In this example, the WSDL-to-Java mapping tool may import the WSDL-based description of the service and map it to a corresponding client side Java-based representation. Generated client side artifacts produced by the mapping may include serializers, deserializers, holder classes, and utility classes. Alternatively, the J2SE-based client may use the javax.xml.rpc.Service interface to create dynamic proxies for the target service endpoint. Further, the same Service interface may be used to create a Call object. Client 510 may follow the creation of a Call object to use the javax.xml.rpc.Call interface to dynamically invoke an operation on the target service endpoint.

Referring back to FIG. 6, once client 510 has invoked a remote method on service endpoint 555, client side runtime system 525 may process the invocation. The processing of a remote method call may include mapping the remote method call to a SOAP message representation, which may be the protocol 535 used by model environment 500 (Step 650). The mapping may include the mapping of parameters, return values, and exceptions for the remote method call to the corresponding SOAP message. Further, the mapping may include the configuration of serialization and deserialization mechanisms based on a mapping between Java types and XML data types. Next, client runtime system 525 may process the created SOAP message (Step 660). This processing may include the processing of the SOAP message based on the mapping of the remote method call to a SOAP representation. An encoding style associated with the SOAP protocol may define how parameters, return values and types in a remote method call are represented in the SOAP message.

In one aspect consistent with certain features related to the present invention, client 510 may support the use of Multipurpose Internet Mail Extensions (MIME) encoded content in a remote method call to a target service endpoint. In accordance with one aspect of the invention, client 510 may use a SOAP message with attachments protocol to support MIME encoded parameters or return values in a remote method call. MIME is a specification for providing a standard for representing and encoding a variety of media types for transmission via electronic mail. For example, a SOAP message package with attachments may be constructed using the MIME multipart/related type. A remote method call may be carried in the root body part of the multipart/related structure of the SOAP message. The headers and body of the SOAP message may refer to the MIME parts in the message package using href attributes and a referenced MIME part may contain either a Content-ID or Content-Location MIME header, which are known headers for the MIME specification.

Figure 7:
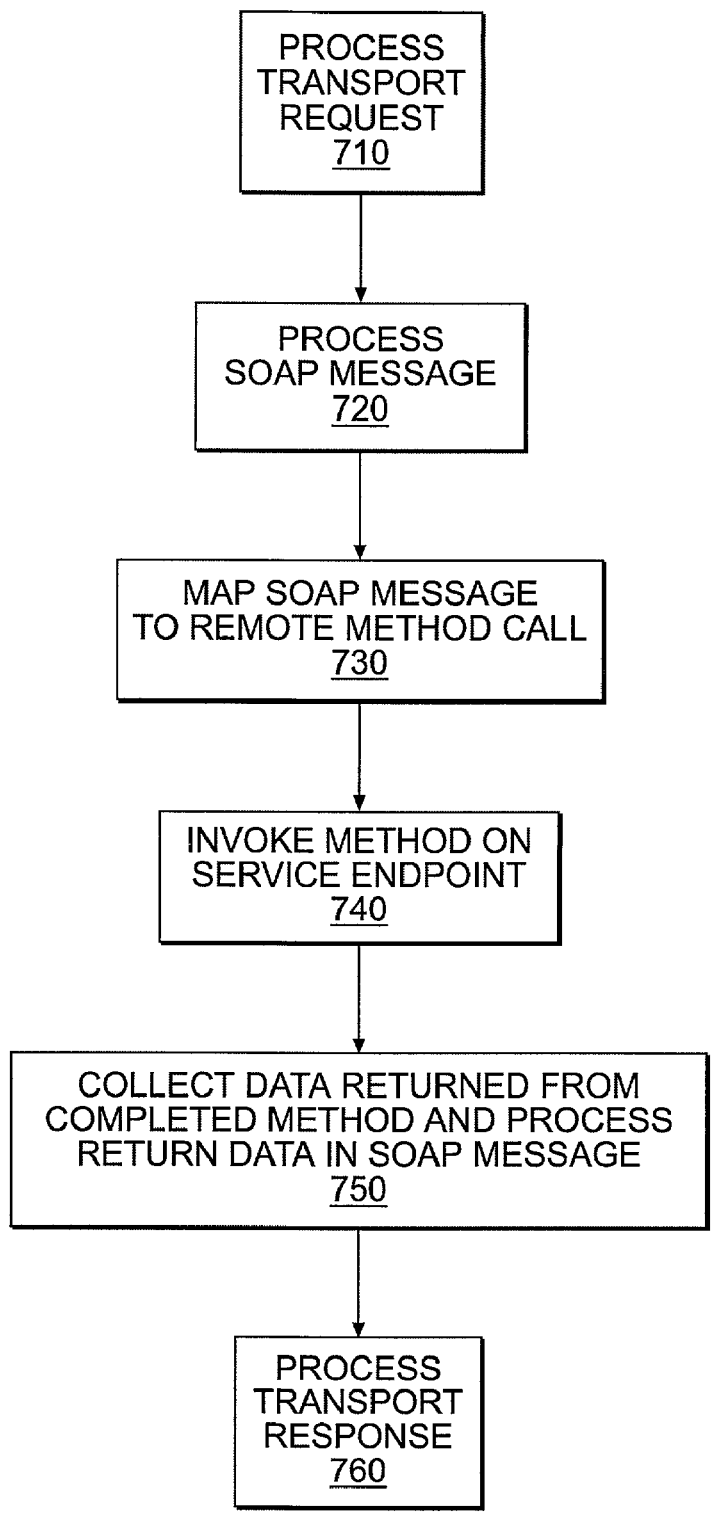
FIG. 7 illustrates a flowchart of an exemplary remote call process consistent with certain features related to the present invention.
Figure 8:
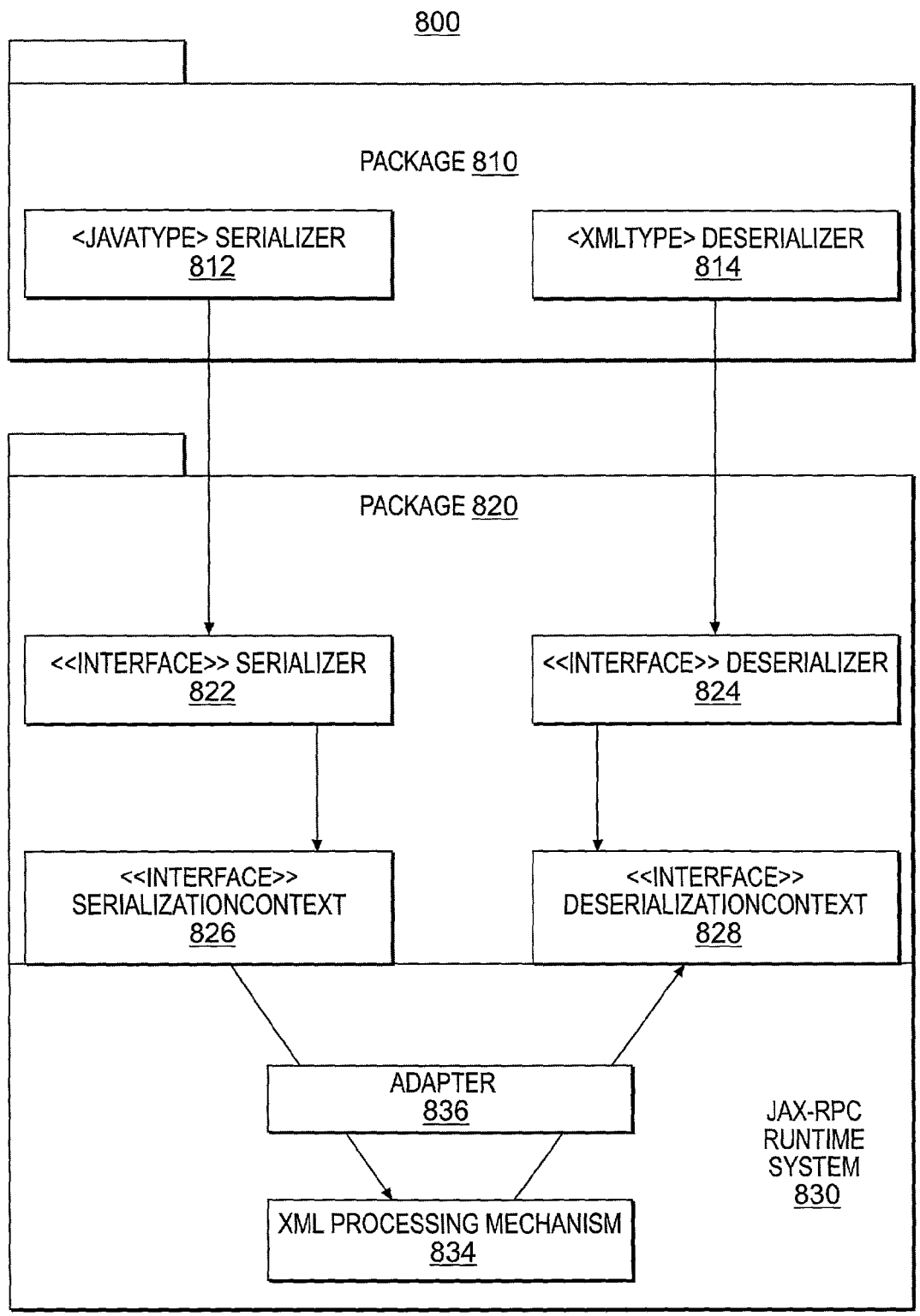
FIG. 8 illustrates a block diagram of an exemplary type mapping framework consistent with certain features related to the present invention.

Once the SOAP message is created and processed, client side runtime system 525 may process a transport request (Step 670). In one aspect consistent with certain features related to the present invention, the transport may be a HTTP transport. The processing of an HTTP request may include the transmission of the SOAP request message as part of an HTTP request. Further, a SOAP response message may be transmitted as an HTTP response. Therefore, the SOAP message including the mapped remote method call is transported to server 530 over transport 540. Server 530 may be configured to process remote method calls received over transport 540. FIG. 7 shows a flowchart of an exemplary server side process consistent with certain features related to the present invention.

As shown in FIG. 7, server side runtime system 570 may receive and process the HTTP request received over transport layer 540 (Step 710). Next, server-side runtime system 570 may extract the SOAP message from the HTTP request and process the SOAP message (Step 720). This processing may include accessing a SOAP envelope, header, body, and any attachments to the SOAP message. In one aspect consistent with certain features related to the present invention, server-side runtime system 570 may use an XML processing mechanism, such as a streaming parser and Simple API for XML (SAX)-based parser, to process the SOAP message. Additionally, in the event the SOAP message includes a RPC call with MIME encoded content, server-runtime system 570 may be configured to use the MIME binding specified in the WSDL version 1.1 specification to support the MIME encoded remote call from client 510.

Once the SOAP message is processed, server-side runtime system 570 may map the SOAP message to a method invocation on the target service endpoint 555 (Step 730). SOAP body elements may carry parameters and a return value for this remote call. Also, a SOAP header may carry any context information that may not be part of a remote method signature, but is associated with the remote method call. Once the SOAP message is mapped to a method invocation, server-side runtime system 570 may invoke the method on the target service endpoint 555 based on the mapping of the received remote method invocation using the core APIs 565 (Step 740). That is, server-runtime system 570 may determine the location (i.e., URL) of a service endpoint 555 included in a container 560 hosting the endpoint and directs the method call to the instance of the service endpoint class that represents the service endpoint 555. The call may invoke one or more methods on the service endpoint, such as a service ( ) method, to generate response data based on the received call.

The return value, out parameters, and exceptions associated with the result data may be collected by container 560 and provided to server-runtime system 570 through core APIs 565. Server-runtime system 570 may encode the result data in corresponding SOAP body, header, and fault elements. These elements may be processed as a SOAP message (Step 750). The processed SOAP message may then be processed as part of an HTTP response which may be carried back to client 510 over transport 540 (Step 760).

Extensible Type Mapping

Methods, systems, and articles of manufacture consistent with certain features related to the present invention may implement APIs that support an extensible type mapping between XML data types and Java types. These APIs may enable server 110 and client 130 to develop pluggable serializers and deserializers to support the extensible mapping between any Java type and XML data type. The pluggable serializers and deserializers may be packaged as part of a JAX-RPC implementation included within client 130 and/or server 110. Alternatively, the pluggable serializers and deserializers may be provided by a service developer and/or other types of users interacting with respective computing systems, namely client 130 and server 110.

The pluggable serializers and deserializers may be developed using various XML processing mechanisms and representations. The performance of a pluggable serializer or deserializer may depend upon the type of XML processing mechanism and representation implemented within client 130 and/or server 110. For example, a Document Object Model (DOM) based serializer may have less performance efficiency than a SAX or streaming parser based deserializer.

Figure 9:
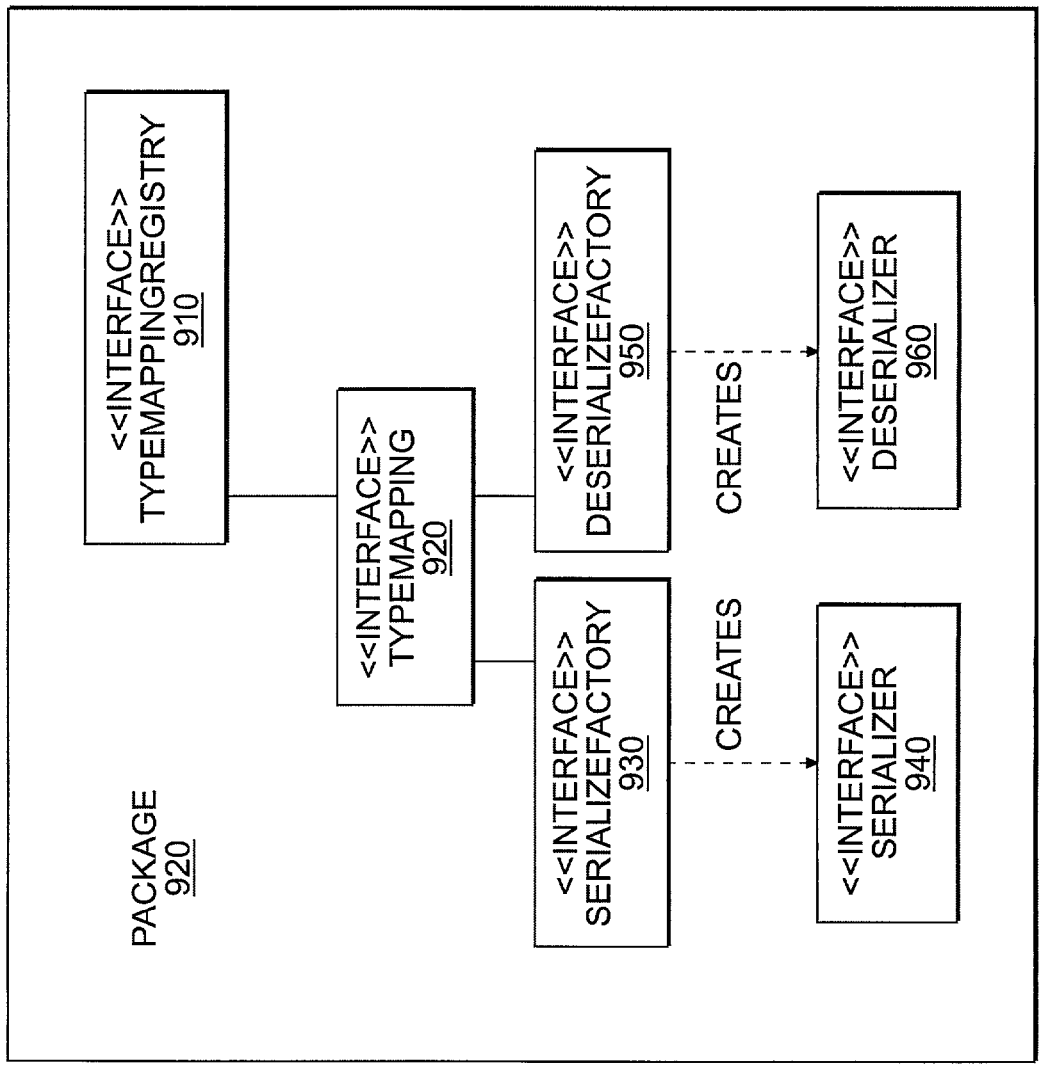
FIG. 9 illustrates a block diagram of an exemplary interface model consistent with certain features related to the present invention.

FIG. 9 shows a block diagram of an exemplary type mapping framework 900 that may be implemented by client 130 and/or server 110 to perform communications over network 120 in a manner consistent with certain features related to the present invention. As shown, framework 900 may include packages 910 and 920, and a host JAX-RPC runtime system 930, which may represent either client-side runtime system 134 or server side runtime system 114 illustrated in FIG. 1. Package 910 may be a package that is constructed by a user, such as a service developer or vendor entity and may include a Java type serializer 912 and an XML type deserializer 914. Package 920 may be a package that defines a set of Java interfaces/classes for the type mapping framework 900. Package 920 may include a serializer interface 922 and a deserializer interface 924. These interfaces may enable the development of pluggable serializers and deserializers that support extensible mapping between XML data types and Java types. The serializer and deserializer interfaces 922 and 924, respectively, may be the base interfaces that are defined to be independent of any XML processing mechanism 934 and XML representation. A JAX-RPC based platform (e.g., client 130 and server 110) may extend these two interfaces to support development of serializers and deserializers based on specific XML mechanisms. For example, XML processing mechanism 934 may be supported by implementation specific serializers and deserializers, such as DOM based XML processing, SAX based XML processing, streaming pull parser, and object-based input and output streams.

Serializer interface 922 may serialize a Java object to an XML representation based on the type mapping defined between the corresponding Java type and the XML data type. For example, serializer interface 922 may include a serializer that is defined for Java arrays and classes in the standard Java Collection framework. Serializer interface 922 may use an XML schema definition for an XML schema instance to generate a corresponding XML representation from a Java object. Conversely to the serializer interface 922, deserializer interface 924 may deserialize an XML element or schema instance to a Java object. The deserialization may be based on the type mapping defined between an XML data type and a corresponding Java type. Deserializer 924 may use the XML schema fragment and corresponding XML schema instance to map to a corresponding Java object.

Further, package 920 may include other interfaces that may be implemented by runtime system 930, namely SerializationContext interface 926 and DeserializationContext interface 928. These two interfaces may provide XML processing and JAX-RPC runtime system 930 related context to the serializers and deserializer interfaces 922, 924 during serialization and deserialization processes.

Because of the versatility associated with a platform's support for various XML processing mechanisms, type mapping framework 900 may not require JAX-RPC runtime system 930 to use a specific XML processing mechanism 934. For example, this mechanism may allow JAX-RPC runtime system 930 to use a streaming pull parser for performance efficient XML processing. Alternatively, DOM- or SAX-based deserializers may be developed and plugged into the extensible mapping framework 900. To support such DOM- or SAX-based deserializers, JAX-RPC runtime system 930 may include an adapter 936 from the underlying XML processing mechanism 934 to both SAX and DOM representation.

Figure 10:
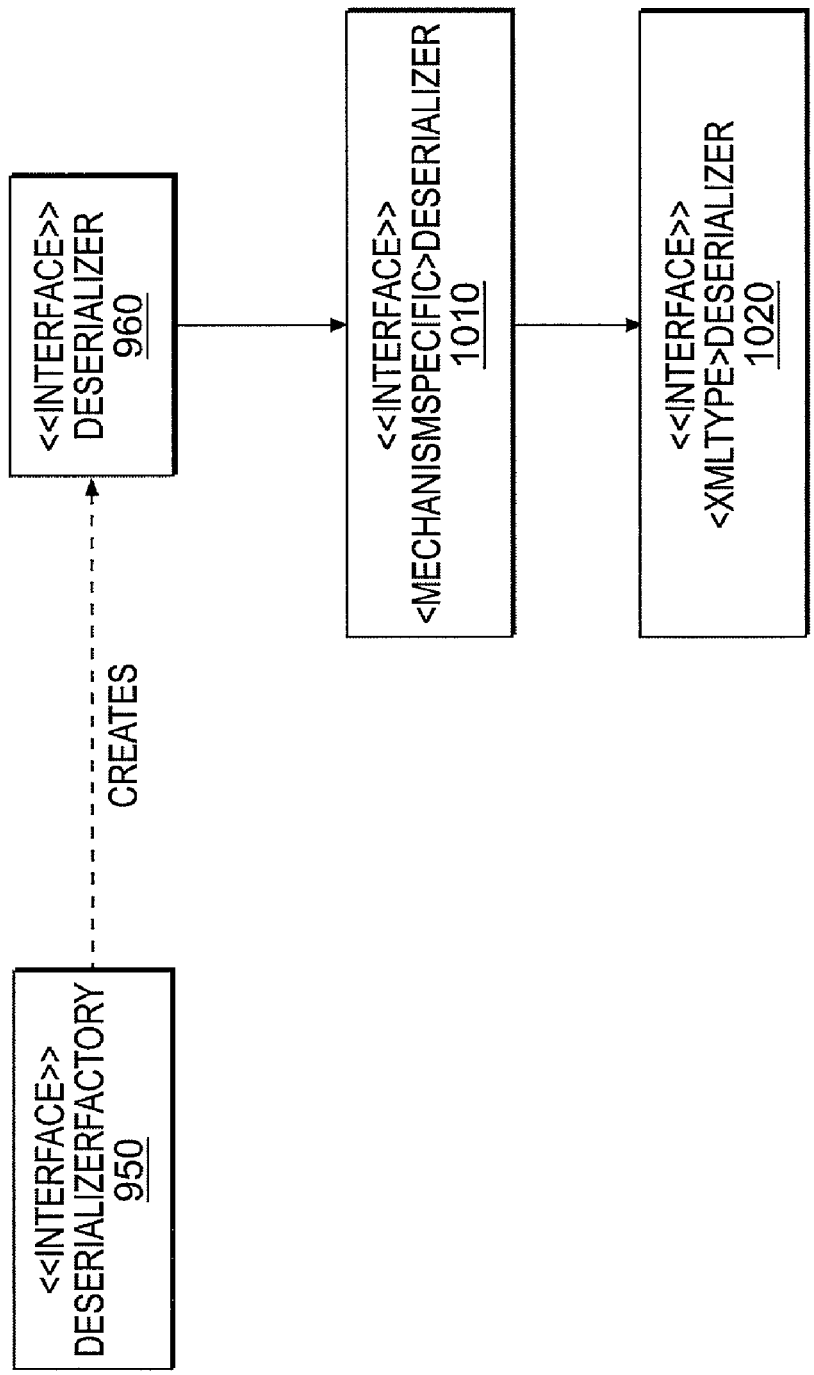
FIG. 10 illustrates a block diagram of another exemplary interface model consistent with certain features related to the present invention.

FIG. 10 shows a block diagram of exemplary package 920, javax.xml.rpc.encoding package, that may be implemented within mapping framework 900. As shown, package 920 may include a registry interface, TypeMappingRegistry 1010, that may define a registry for the type mappings for various encoding styles and XML schema namespaces. For example, the java.xml.rpc.encoding.TypeMappingRegistry interface 1010 may be defined as:

related to the present invention, a default TypeMapping instance may not be required to be registered in the TypeMappingRegistry. If a default TypeMapping instance is registered, other TypeMapping instances registered though the TypeMappingRegistry.register method (for a set of namespace URIs) may override the default Typemapping instance.

The method getSupportedNamespace in the exemplary TypeMappingRegistry interface may return a list of registered namespace URIs in this TypeMappingRegistry instance. The method getTypeMapping method may return the registered TypeMapping for the specified namespace URI. If there is no registered TypeMapping for the specified namespaceURI, this method may return a null value. Further, this method may throw the java.lang.IllegalArgumentException if an invalid namespace URI is specified. The method clear may remove all registered TypeMapping instances from the exemplary TypeMappingRegistry interface. The method createTypeMapping may create an empty

```
package javax.xml.rpc.encoding;
public interface TypeMappingRegistry extends java.io.Serializable {
        public void register (TypeMapping mapping, String [ ] namespaceURIs)
                throws JAXEPCException;
        public void registerDefault (TypeMapping mapping)
                throws JAXRPCException;
        public TypeMapping getTypeMapping (String namespaceURI);
        public void removeTypeMapping (String namespaceURI);
        public TypeMapping createTypeMapping( );
        public String [ ] getSupportedNamespace( );
        public void clear ( );
}.
```

In the above exemplary TypeMappingRegistry interface, the method register (TypeMapping, String [ ]) may add a TypeMapping instance to the TypeMappingRegistry interface. The parameter namespaceURIs may be String [ ] of namespace URIs. For example, SOAP encoding may be represented by the namespace URI: {http://schema.xml.org/soap/encoding/}. The register method may throw the java-.lang.illegal ArgumentException if an invalid namespace URI is specified.

The registerDefault (TypeMapping) method may register a TypeMapping instance that is a default for all encoding styles and XML schema namespaces supported by the TypeMappingRegistry interface. A default TypeMapping instance may include serializers and deserializers that are independent of and usable with any encoding style or XML namespace. In one aspect consistent with certain features TypeMapping object that maybe used by TypeMapping interface 1020, described below.

In one aspect consistent with certain features related to the present invention, the javax.xml.rpc.Service interface implemented with client 130 may support the configuration of a TypeMappingRegistry interface. For example, the Service interface may be configured within client 130 as follows:

```
package javax.xml.rpc;
public interface Service {
        public void setTypeMappingRegistry (TypeMappingRegistry registry);
        public TypeMappingRegistry getTypeMappingRegistry ( );
}.
```

The method getTypeMappingRegistry in the above exemplary Service interface may return the configured TypeMappingRegistry. This getter method may throw the java.lang.UnsupportedOperationException if the Service class does not support the configuration of a TypeMappingRegistry. The setTypeMappingRegistry method may set the TypeMappingRegistry interface. Dynamic proxies, Call objects, or instances of generated stub classes created from the service class may use the configured type mapping registry to access the extensible type mapping framework 900. For example, a dynamic proxy may use the configured TypeMappingRegistry interface to perform serialization and deserialization of the Java and XML data types. A generated stub class may embed the type mapping support in the generated code of the class and thus may not be required to use the configured type mapping registry.

Referring back to FIG. 10, package 920 may also include a TypeMapping interface 1020 that is the base interface for the representation of type mappings. TypeMapping interface 1020 may support a set of encoding styles and XML schema namespaces. This interface may include a setSupportedEncodings method that returns the namespace URIs (as String [ ]) supported by a TypeMapping instance. Further, the TypeMapping interface 1020 may include a setSupportedEncodings method that sets the supported namespace URIs and XML namespaces for a TypeMapping instance. For example, the following code represents an exemplary TypeMapping interface that may be implemented by methods, systems, and articles of manufacture consistent with certain features related to the present invention.

```
package javax.xml.rpc.encoding;
public interface TypeMapping {
    public void setSupportedEncodings(String [ ] namespaceURIs);
    public String [ ] getSupportedEncodings ( );
    public void register (Class javaType, Qname xmlType,
                SerilaizerFactory sf,
                DeserializerFactort dsf)
            throws JAXRPCException;
    public SerializerFactory getSerilaizer (Class javaType,
                Qname xmlType)
            throws JAXRPCException;
    public DeserializerFactory getDeserializer (Class javaType,
                Qname xmlType)
            throws JAXRPCException;
    public void removeSerializer (Class javaType, Qname xmlType)
            throws JAXRPCException;
    public void removeDeserializer (Class javaType, Qname xmlType)
            throws JAXRPCException;
}.
```

In one aspect consistent with certain features related to the present invention, serializers and deserializers may be developed independent of any specific encoding style or XML schema namespace. These serializers and deserializers may be usable across multiple encoding styles. A TypeMapping instance that contains these types of serializers and deserializers may pass a null value to the setSupportedEncodings method and return null from the getSupportedEncodings method. Also, for its supported encoding styles and XML schema namespaces, a TypeMapping instance may maintain a set of tuples of the type {Java type, SerializerFactory, DeserializerFactory, XML data type}. The getSerializer and getDeserializer methods may take both javaType and xmlType parameters, which enables serializers and deserializers to support a flexile mapping between the XML data types and Java types. For example, a deserializer may map a specific XML data type to different Java types based on the application specific configuration associated with the platform runtime system 930 is implemented Package 920 may also include a SerializerFactory interface 1030 and Serializer interface 1040. The Serializer interface 1040 may define the base interface for serializers. A serializer may serialize a Java object to an XML representation using specific an XML processing mechanism 934.

A pluggable serializer for a java type may provide serializer and serializer factory classes that implement the Serializer and SerializerFactory interfaces, respectively. These interfaces may be implemented as JavaBeans components that enable tools within a corresponding platform to manage and configure the serializers. The SerializerFactory may be registered with a TypeMapping instance as part of the type mapping registry. In one aspect consistent with certain features related to the present invention, the SerializerFactory interface may be defined as follows:

```
package javax.xml.rpc.encoding;
public interface SerializerFactory extends java.io.Serializable {
    public Serializer getSerializerAs (string mechanismType)
            throws JAXRPCException;
    public Iterator getSuppoortedMechanismTypes( );
}.
```

In the above exemplary SerializerFactory interface, the method getSerializerAs may return an XML processing mechanism specific serializer. The parameter mechanismType may identify the desired XML processing mechanism type. This method may throw the JAXRPCException if the SerializerFactory does not support the desired XML processing mechanism type. The method getSupportedMechanismTypes may return all XML processing mechanism types supported by this exemplary SerializerFactory interface.

In accordance with one aspect consistent with certain features related to the present invention, the Serializer interface 1040 may be defined as:

```
package javax.xml.rpc.encoding;
public interface Serializer extends java.ioSerializable {
    public String getMechanismType( );
}.
```

Because an XML specific processing mechanism specific serializer may extend the base Serializer interface, the getMechanismType method may return the type of the XML processing mechanism and representation used by the serializer. Further, because the javax.xml.xml.rpc.encoding.SerializationContext interface 924 may be implemented by JAX-RPC runtime system 930 in an XML processing mechanism specific manner, a serializer may use the SerializationContext interface during a serialization process to get the context information related to the XML processing mechanism 934 and manage information specific to this serialization process.

Package 920 shown in FIG. 10 may also include a DeserializerFactory interface 1050 and a Deserializer interface 1060. Deserialization interface 1060 may define the base interface for different types of deserializers implemented by JAX-RPC runtime system 930. A deserializer may convert an XML element or schema instance to a Java object. Such deserialization may be based on the type mapping defined between an XML data type and a corresponding Java type. A pluggable deserializer for an XML data type may provide deserializer an deserializer factory classes that implement Deserializer and DeserializerFactory interfaces, respectively. For example, a deserializer may be configured for complex types defined in the XML Schema specification. The Deserializer and DeserializerFactory interfaces may be implemented as JavaBean components that enable tools within a corresponding platform to manage and configure the deserializers. The DeserializerFactory interface may be registered with a TypeMapping instance as part of the type mapping registry. In one aspect consistent with certain features related to the present invention, the DeserializerFactory interface 1050 may be defined as follows:

```
package javax.xml.rpc.encoding;
public interface DeserializerFactory extends java.io.Serializable {
        public Deserializer getDeserializerAs (string mechanismType)
                throws JAXRPCException;
        public Iterator getSuppoortedMechanismTypes( );
}
```

In the above exemplary DeserializerFactory interface, the method getDeserializerAs may return an XML processing mechanism specific deserializer. The parameter mechanismType may identify the desired XML processing mechanism type. The getDeserializerAs method may throw a JAXRPCException if the DeserializerFactory instance does not support the desired XML processing mechanism type. The getSupportedMechanismTypes method may return all XML processing mechanism types supported by the DersializerFactory interface. In accordance with one aspect consistent with certain features related to the present invention, the Deserializer interface 1060 may be defined as:

```
        package javax.xml.rpc.encoding;
        public interface Deserializer {
                public String getMechanismType( );
        }.
```

Figure 11:
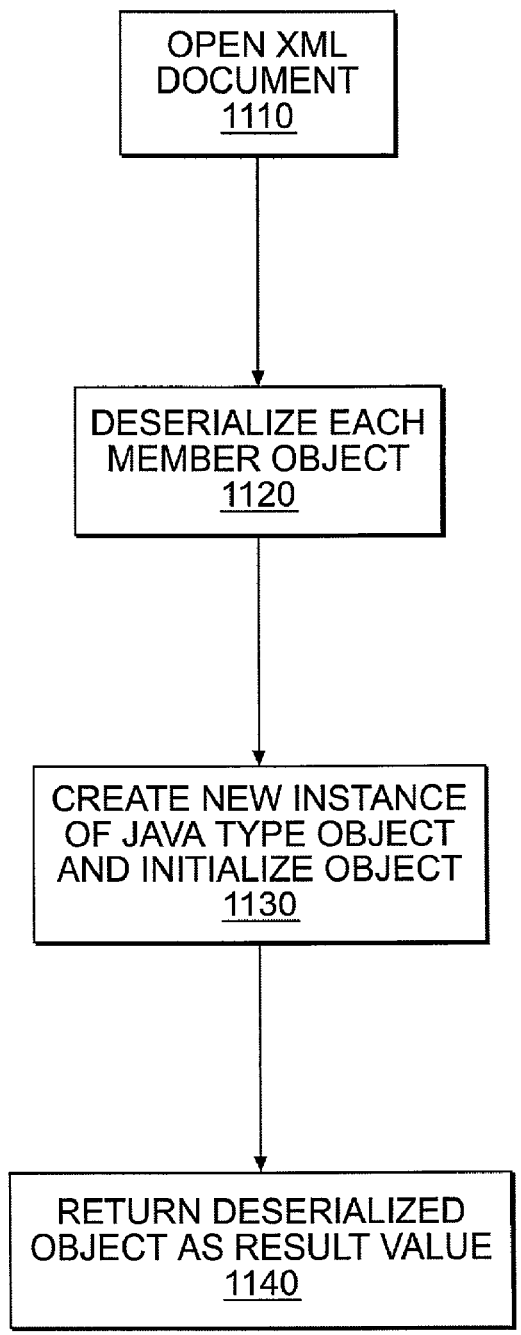
FIG. 11 illustrates a flowchart of an exemplary deserialize process consistent with certain features related to the present invention.

Because an XML specific processing mechanism specific deserializer, such as a DOM, SAX, streaming parser, or stream based deserializer, may extend the base Deserializer interface, the getMechanismType method may return the type of the XML processing mechanism supported by this type of deserializer. FIG. 11 shows a block diagram of an exemplary model reflecting how an exemplary XML processing mechanism specific deserializer 1110 may extend the base Deserializer interface 1060. DeserializerFactory interface 1050 may create an instance of the DeserializerFactory 1050, which may be implemented by a <MechanismSpecific>Deserializer interface 1110 and <XMLType>Deserializer interface 1120.

Further, because the javax.xml.xml.rpc.encoding.DeserializationContext interface 926 may be implemented by JAX-RPC runtime system 930 in an XML processing mechanism specific manner, a deserializer may use the DeserializationContext interface 926 during a deserialization process to access and maintain the context information related to the XML processing mechanism 934.

Serialization Framework

In accordance with one aspect consistent with certain features related to the present invention, client 130 and server 110 may implement a serialization framework that may include interfaces, classes, and algorithms to serialize and deserialize messages using encoding techniques associated with a particular protocol, such as SOAP. The framework may be used to serialize and deserialize all Java types that are subtypes of java.lang.Object, including JavaBeans, structures, arrays, boxed primitives, and any other kind of object. Primitive Java types (i.e., int, float, etc.) may be handled by a similar serialization framework.

SOAP encoding techniques may allow arbitrary graphs of Java objects to be serialized as XML data. In typical SOAP encoding systems, when an object graph contains multiple references to the same object, the HREF mechanism of the SOAP encoding protocol may be used to preserve object identity, thus making it possible to restore an object graph exactly as it was before serialization.

Serialization

In accordance with one aspect consistent with certain features related to the present invention, when client 510 prepares to send data to server 510, such as when a remote call is made to a service endpoint 555 maintained by server 530, the client 510 may create an instance of a stub class 515 as shown in FIG. 5. The generated stub 515 may serialize a Java object when transmitting information to server 530 using protocol 535 and transport 540. To serialize a Java object, the stub 515 may obtain a reference to a serializer for the object's type. A serializer is a class that may encode instances of a particular Java type as XML using SOAP encoding. A serializer class may implement a SOAPSerializer interface, described below. Further the serializer class may be stateless, which allows the JAX-RPC runtime system that is implementing the serialization framework to create and reuse a single serializer instance for each XML schema data type in the system. This may minimize the number of serializer objects that are created by a platform hosting the runtime system. Further, the serializer class may be multi-thread safe, meaning that the serializer class allows the host JAX-RPC runtime system to use a single serializer instance across multiple threads simultaneously.

To serialize a Java object, a generated stub may invoke a serialize method on the reference to the serializer, passing as parameters the object to be serialized, XMLWriter, and an instance of the SOAPSerializationContext class. XMLWriter may be an instance of an XMLWriter interface that may be used by a host JAX-RPC runtime system to write XML documents. The serialize method may create the XML representation of the Java object by using the passed-in XMLWriter, which may provide methods for writing XML elements to a stream.

Serializing a particular object may comprise opening a new XML element that represents the object, and then creating sub-elements for each of the object's members. Each member is serialized by invoking the serialize method on an appropriate serializer, passing in the same XMLWriter and SOAPSerializationContext instances that were used to serialize the parent object. After serializing each of its members, the serialize method may close the XML element for the object and returns. For example, suppose that an instance of a Java class named Address is to be serialized.

The code for the Address class may be represented as:

```
Address address = new Address("1234 Riverside Drive",
                    "Gainesville",
                    "Georgia", "30506");
XML Writer writer = new XMLWriter(. . .);
SOAPSerializationContext serContext =
                    new SOAPSerializationContext(. . .);
AddressSerializer addresser = new AddressSerializer(. . .);
addresser.serialize(address, new QName(null, "home-address"),
                    writer, serContext);
serContext.serializeTrailingBlocks (writer);.
```

The XML code that may be emitted by a serialize process for the above exemplary instance may be represented as:

```
<home-address href = "#ID-1"/>
<tns:Address xsi:type = "tns:Address"id ="ID-1">
    <street href = "#ID-2"/>
    <city href = "#ID-3"/>
    <state href = "#ID-4"/>
    <zip href = "#ID-5"/>
</tns:Address>
</soapenc:string xsi:type = "xsd:string" id = "ID-2">1234 Riverside Drive
</soapenc:string>
</soapenc:string xsi:type = "xsd:string" id = "ID-3">Gainseville
</soapenc:string>
</soapenc:string xsi:type = "xsd:string" id = "ID-4">Georgia
</soapenc:string>
</soapenc:string xsi:type = "xsd:string" id = "ID-5">30506
</soapenc:string>.
```

SOAPSerializationContext Class

The SOAPSerializationContext class may contain information that may be shared among and passed between the serializers that participate in the serialization of a graph of Java objects. An object graph is a representation of objects based on their relationship with other objects. For example, a definition may be represented as an object graph that describes decedent and ancestor objects that are related to one another, such as representations of all sharing and circular references of objects. As an object graph is being serialized, the same SOAPSerializationContext instance may be passed to each serializer that participates. Each method in the SOAPSerializer interface may accept a parameter of type SOAPSerializationContext, which may be used to propagate the context between the various serializers participating in the serialization. Also, the SOAPSerializationContext class may ensure correct processing of HREFs. A SOAPSerializationContext class may contain a map from object references to SOAPSerializationState objects. The first time a new object is encountered in the serialization process, a SOAPSerializationState object may be created for the new object and added to the map. The SOAPSerializationState for an object may store a unique ID assigned to that object and a reference to the serializer for the object. In one aspect consistent with certain features related to the present invention, the class SOAPSerializationState may be defined as:

```
package com.sun.xml.rpc.encoding.soap;
public class SOAPSerializationState {
    // . . .
```

```
    public SOAPSerializationState(Object obj, String id,
                        SOAPSerializer serializer) { . . . }
    public Object getObject ( ) { . . . }
    public String getID ( ) { . . . }
    public SOAPSerializer getSerializer ( ) { . . . }
}.
```

The SOAPSerializationState object may associate a unique ID with each object may allow the serialization framework to preserve object identity in the SOAP encoded object graph by always using the same ID for an object as it encodes href and id attributes. Further, the SOAPSerializationState class may associate a serializer with each object, thus allowing the serialization framework to know which serializers to call as it serializes the independent elements that represent multiple-reference objects.

In accordance with one aspect consistent with certain features related to the present invention, the SOAPSerializationContext class may be defined as follows:

```
package.com.sun.xml.rpc.encoding.soap;
public class SOAPSerializationContext
            implements javax.xml.rpc.encoding.SerializtionContext {
    // . . .
    public SOAPSerializationContext ( )
                    throws SerializationException { . . . }
    public SOAPSerializationContext (String prefix)
                    throws SerializationException { . . . }
    public SOAPSerializationState registerObject (Object obj,
                        SoapSerializer serializer)
                    throws SerializationException { . . . }
    public SOAPSerializationState lookupObject (Object obj)
                    throws SerializationException { . . . }
    public void serializeTrailBlocks (XMLWriter writer)
                    throws SerializationException { . . . }
}.
```

The registerObject method in the above exemplary SOAPSerializationContext class may be called by serializers to add an object to the serialization context. References to the object and its serializer are passed as parameters to registerObject, which may generate a unique ID for the object and adds a SOAPSerializationState for the object to its internal map. If the object has already been registered, registerObject may simply return the existing SOAPSerializationState for the object. The lookupObject method in the SOAPSerializationContext class may be used by serializers to determine if an object already exists in the serialization context, and, if so, to gain access to the SOAPSerializationState for the object. If the object is unknown to the serialization context, the lookupObject method may return a null value. The SerializeTrailingBlocks method may be called at the end of the serialization process to serialize independent elements (or trailing blocks) for each of the multi-reference objects encountered during the serialization process.

SOAPSerializer Interface

In one aspect consistent with certain features related to the present invention, all serializers may implement the SOAPSerializer interface. This interface may be defined as:

```
package com.sun.xml.rpc.encoding.soap;
public interface SOAPSerializer
        extends javax.xml.rpc.encoding.Serializer {
    // . . .
    public void serializeReference (Object obj, QName name,
                                    XMLWriter writer,
                                    SOAPSerializationContext context)
            throws SerializationException
    public void serializeInstance (Object obj, QName name,
                                   Boolean isMultiRef,
                                   XMLWriter writer,
                                   SOAPSerializationContext context)
            throws SerializationException;
    public void serialize (Object obj, QName name,
                           XMLWriter writer,
                           SOAPSerializationContext context)
            throws SerializationException;
}.
```

In the above exemplary SOAPSerializer interface, the serializeReference method may serialize a HREF to the passed-in object. The obj parameter may be a reference to the object that is to be serialized. The name parameter may be the name to be used for the XML element that represents the object. The writer parameter may be the XMLWriter that may be used to write the XML representation of the object. The context parameter may be the SOAPSerializationContext that maybe used during serialization of the object. For example, the following code may be used to serialize an HREF to an object (as opposed to serializing the object itself):

```
Address address = new Address ("1234 Riverside Drive",
                               "Gainesville",
                               "Georgia", "30506");
XMLWriter writer = new XMLWriter (. . .);
SOAPSerializationContext serContext =
        new SOAPSerializationContext (. . .);
AddressSerializer addresser = new AddressSerializer (. . .);
addresser.serializeReference (address,
                new QName(null, "home-address"),
                writer, serContext);
serContext.serializeTrailingBlocks (Writer);.
```

The XML emitted by the above exemplary code may look like:

```
<home-address href="#ID-1"/>
```

The psuedo-code for a serializer's serializeReference method may be defined as:

```
public void serializeReference (Object obj, QName name,
                                XMLWriter writer,
                                SOAPSerializationContext context)
        throws SerializationContext {
    if(obj == null) {
        create a new element with the specified name
        set the element's xsi:null attribute to "true"
        set the element's xsi:type attribute to the appropriate XSD type
        close the element
    }
    else {
        create a new element with the specified name
        SOAPSerializationState state = context.resgisterObject (Obj,this);
            set the element's href attribute to state.getID ( )
            close the element
    }
}.
```

The serializeInstance method in the above exemplary pseudo-code may serialize the object instance itself. The obj parameter may be a reference to the object that is to be serialized. The name parameter may be the name to be used for the XML element that represents the object. The is MultiRef parameter may indicate whether the object is a single-reference or a multiple-reference instance. A multiple-reference instance may have an id attribute, while a single-reference instance may not have such an attribute. The writer parameter may be the XMLWriter used to write the XML representation of the object. And, the context parameter may be the SOAPSerializationContext that may be used during serialization of the object. For example, the following code may be used to serialize a multiple-reference object in a manner consistent with certain features related to the present invention:

```
Address address = new Address ("1234 Riverside Driver",
                               "Gainesville",
                               "Georgia", "30506");
XMLWriter writer = new XMLWriter (. . .);
SOAPSerializationContext serContext =
        new SOAPSerializationContext (. . .);
AddressSerializer addresser = new AddressSerializer (. . .);
addresser.serializeInstance (address,
                new QName(null, "home-address"),
                true, writer, serContext);
serContext.serializeTrailingBlocks (Writer);.
```

The XML emitted by the above exemplary serialization code may be represented as:

```
<home-address href= "#ID-1"/>
<tns:Address xsi:type = "tns:Address" id="ID-1">
        <street href = "#ID-2"/>
        <city href = "#ID-3"/>
        <state href = "#ID-4"/>
        <zip href = "#ID-5"/>
</tns:Address>
<soapenc:string xsi:type= "xsd:string"id = "ID-2">1234 Riverside Drive
</soapenc:string>
<soapenc:string xsi:type = "xsd:string"= id "ID-3">Gainseville
</soapenc:string>
<soapenc:string xsi:type = "xsd:string"id = "ID-4">Georgia
</soapenc:string>
<soapenc:string xsi:type = "xsd:string"id = "ID-5">30506
</soapenc:string>.
```

In one aspect consistent with certain features related to the present invention, an exemplary pseudo-code for a serializer's serializeInstance method may be defined as:

```
public void serializeInstance (Object obj, QName name,
                               Boolean isMultiRef,
                               XMLWriter writer,
```

```
                    SOAPSerializationContext context)
                    throws SerializationContext {
        if (obj == null) {
            create a new element with the specified name
                set the element's xsi:null attribute to "true"
            set the element's xsi:type attribute to the appropriate XSD type
                close the element
        }
        else {
            create a new element with the specified name
            set the element's xsi:type attribute to the appropriate XSD type
            if (isMultiRef) {
                SOAPSerializationState state =
                    context.resgisterObject (Obj, this);
                set the element's id attribute to state.getID ( )
            }
            for each member M of this object {
                create a sub-element for M by calling the serialize method
                    on the serializer for M's type
            }
            close the element
        }
}.
```

The serialize method in a serializer may perform "default" serialization of the passed-in object. Each serializer may be allowed to decide whether its data type should be serialized as a single-reference or multiple-reference instance by default. If a serializer chooses single-reference to be the default, then calling the serialize method may have the same effect as calling serializeInstance with the isMultiRef parameter set to false. Alternatively, if a serializer chooses multiple-reference as its default serialization mode, then calling the serialize method may have the same effect as calling serializeReference. Further, code invoking a serializer may choose to explicitly call serializeReference or serializeInstance if it knows exactly how it wants to serialize the object. In one aspect consistent with certain features related to the present invention, the psuedo-code for a serialize method implemented by a serializer may be represented by the following code fragment:

```
public void serialize (Object obj, QName name,
                XMLWriter writer
                SOAPSerializationContext)
                throws SerializationContext {
        if(multiple-reference is the default serialization mode) {
            serializeReference (obj, name, writer, context);
        }
        else {
            serializeInstance (obj, name, false, writer, context);
        }
}.
```

Serializing Trailing Blocks

When a graph of Java objects is serialized by a host JAX-RPC runtime system, references between objects may be serialized as HREFs by calling the serializeReference method, either indirectly or through the serialize method. As a serialization process proceeds, the SOAPSerializationContext may create a SOAPSerializationState for each object that is referenced. In addition to the unique ID of the object, the SOAPSerializationState may store a reference to the object's serializer, which may be determined when the first reference to the object is serialized. In addition to storing a map from object references to SOAPSerializationStates, the SOAPSerializationContext may also store a list of objects that have been referenced during serialization, but have yet to be serialized themselves (i.e., a list of multiple-reference objects). This may be referred to as trailing blocks. After explicitly invoking the serializers for each root of an object graph, the serialization process may call the serializeTrailingBlocks method on the SOAPSerializationContext in order to finish serializing all of the trailing blocks. The serializeTrailingBlocks method may serialize each multiple-reference object in the list as a top-level independent element with its id attribute set to the appropriate value. Each multiple-reference object, however, may contain references to other objects. In this case, the list of objects that need to be serialized may grow as the serializeTrailingBlocks proceeds. Accordingly, the serialize process may continue with the above described procedures until the list is empty, at which point the object graph has been completely serialized.

Deserialization

In accordance with one aspect consistent with certain features related to the present invention, when a host JAX-RPC runtime system receives a message over transport 540, it may deserialize an object included in a message encoded according to protocol 535. When a host JAX-RPC runtime system needs to deserialize an object, it may obtain a reference to a deserializer for the object's type. A deserializer may be a class that includes code that recreates instances of a particular Java type that have been serialized using encoding techniques according to protocol 535, such as SOAP encoding. The host runtime system may invoke a deserialize method on the object and pass as parameters an XMLReader instance that may contain the SOAP encoded XML representation of the object and an instance of a SOAPDeserializationContext interface. The deserialize method may reconstruct the object from the XML representation and return a reference to the object as a result value. The XMLReader instance may be an instance of an XMLReader interface that provides a high-level streaming parser interface for reading XML documents.

Figure 12:
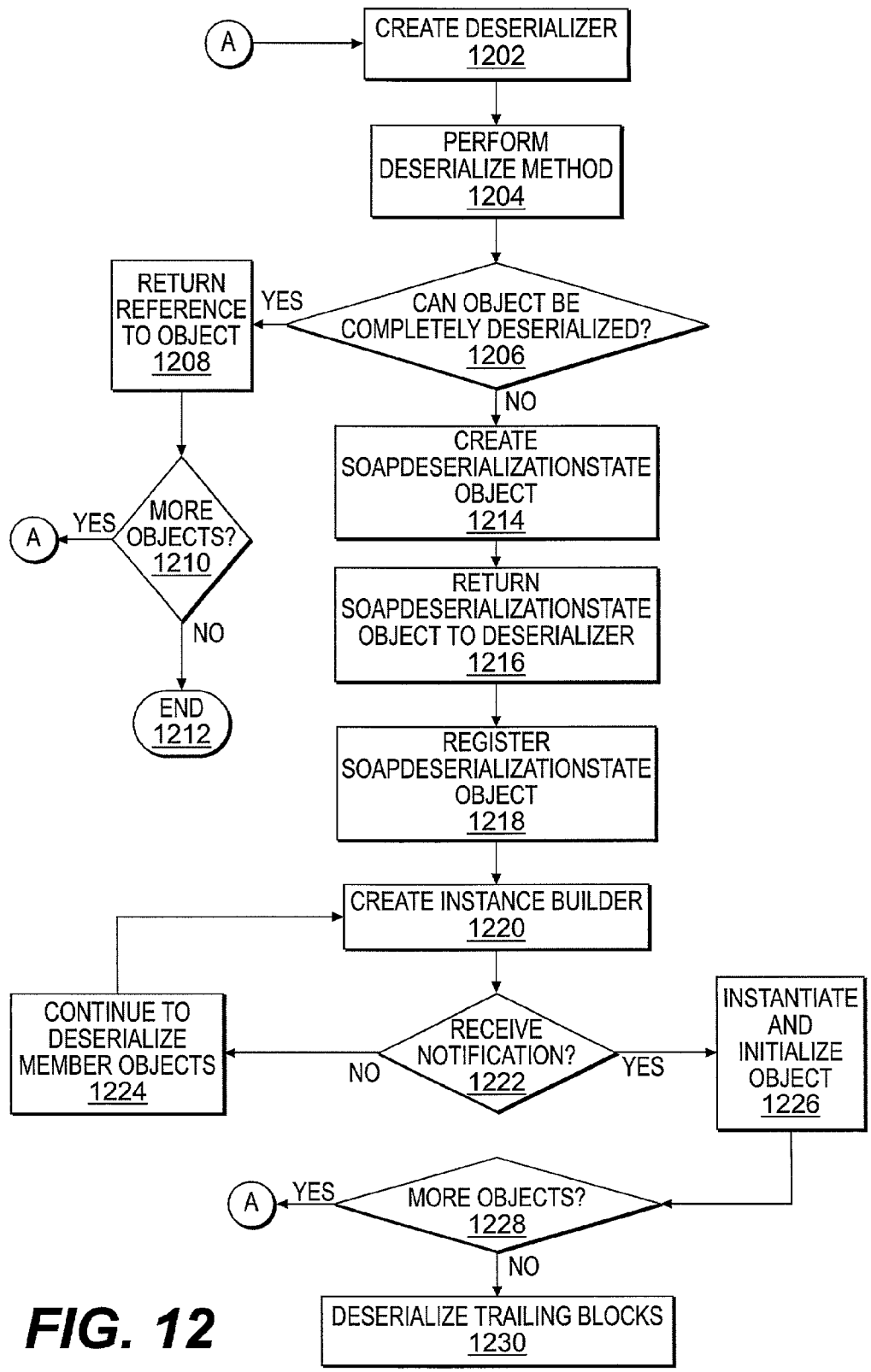
FIG. 12 illustrates a flowchart of another exemplary deserialize process consistent with certain features related to the present invention.

FIG. 12 shows a flowchart of an exemplary deserialize process that may be performed by methods, systems, and articles of manufacture consistent with certain features related to the present invention. As shown, to deserialize an object, a host JAX-RPC runtime system may open an XML element that represents an object (Step 1210), and recursively deserialize each of the object's members which are encoded as sub-elements (Step 1220). The host JAX-RPC runtime system may deserialize each member of the object by invoking the deserialize method on an appropriate deserializer, passing in the same XMLReader and SOAPDeserializationContext that was used to deserialize a parent object. Once the object's members are deserialized, a new instance of the Java type is created and initialized with the deserialized members (Step 1230). Last the new object may be returned as a result of the deserialize method (Step 1240).

The deserialization of objects is made more complex by the HREF mechanism supported by SOAP encoding. Ideally, whenever the deserialize method is called, a deserializer would be able to completely instantiate and initialize the object being deserialized, and return it as the result of the deserialize method. If the SOAP encoded representation of the object contains HREFs to other objects, however, the deserialize method may not be able to fully reconstitute the object if referenced member objects have not yet been deserialized. Accordingly, only when all member objects have been deserialized will the parent object be deserialized by the deserializer, and this condition may not be satisfied until much later in the deserialization process. For this reason, the serialization framework consistent with certain features related to the present invention allows the deserialize method to only partially deserialize an object, and then register listeners that allow it be notified later when its incomplete member objects become available (i.e., have been deserialized themselves). Methods, systems, and articles of manufacture consistent with certain features related to the present invention enable a serialized data stream to be consumed by a host runtime system as it is encountered, rather than stored and rescanned at a later time.

Deserializers

A deserializer may be a stateless Java class that enables a host JAX-RPC runtime system to create and reuse a single deserialize instance for each XML schema data type in the host system, thus minimizing the number of deserializer objects that are created. Alternatively, a deserializer may store an immutable state that is initialized when the deserializer instance is constructed. Further, a deserializer may be multi-thread safe. That is, the deserializer may allow the host JAX-RPC runtime system to use a single deserializer instance across multiple threads simultaneously.

A deserializer may implement the SOAPDeserializer interface, which may be defined as:

```
package com.sun.xml.rpc.encoding.soap;
public interface SOAPDeserializer
        extends javax.xml.rpc.encoding.Deserializer {
    public Object deserialize (QName name, XMLReader reader,
            SOAPDeserializationContext context)
            throws DeserializationException;
}.
```

The deserialize method in the SOAPDeserializer interface may be called to deserialize an object. The name parameter may be the expected name of the XML element that contains the object. If the actual element name does not match the expected element name, deserialize may throw an exception. The reader parameter contains the SOAP encoded XML data that is to be deserialized. The context parameter contains information that may be shared among the passed between the deserializers that participate in the deserialization of an object graph. As an object graph is deserialized, the same SOAPDeserializationContext instance may be passed to each deserializer that participates in the deserialization process. The deserialize method may return a reference to a completely deserialized Java object, or as described below, the method may return an object reflecting an incomplete deserialized object.

SOAPDeserializationContext Class

The SOAPDeserializationContext class may store information that is used to reconstruct object graphs that use the SOAP encoding HREF mechanism. In one aspect consistent with certain features related to the present invention, the SOAPDeserializationContext class may store a SOAPDeserializationState object for each object encountered during the deserialization process that cannot be completely deserialized by the deserializer method implemented by a deserializer. As previously described, an ideal deserialization process may involve the deserialize method returning a reference to the object it was asked to deserialized. There are scenarios, however, in which a deserialize method may be unable to completely deserialize an object. These scenarios may include when the deserializer has been instructed to deserialize an HREF to an object and the object itself has not yet been completely deserialized, and when the object being deserialized contains references (either directly or indirectly) to other objects which have not yet been completely deserialized.

In accordance with one aspect consistent with certain features related to the present invention, when either of the above exemplary scenarios are encountered, instead of returning a reference to the object itself, the deserialize method may return a reference to the SOAPDeserializationState for that object. The SOAPDeserializationState object returned by the deserialize method may have been registered with the SOAPDeserializationContext class so that it can be accessed by other deserializers that participate in deserialization of the object graph.

A SOAPDeserializationState object may store several pieces of information that track the progress of an object as it is being deserialized. This information may include a reference to the object, which may be null if it has not been instantiated, the current state of the object, information about other objects that from which the object being deserialized depends, information about other objects that depend on this object, a reference to the deserializer for this object, and a reference to a SOAPInstanceBuilder instance (described below) for this object. For example, the following code shows the code for a definition of an exemplary SOAPDeserializationState object:

```
package com.sun.xml.rpc.encoding.soap;
public class SOAPDeserializationState {
    // ...
    public SOAPDeserializationState ( ) { ... }
    public void setInstance (Object instance) { ... }
    public Object getInsatne ( ) { ... }
    public boolean isComplete ( ) { ... }
    public void doneReading ( ) { ... }
    public void setDeserializer (SoapDeserializer deserializer)
            throws DeserializationException { ... }
    public void registerListener(
            SOAPDeserializationStateparentState,
            int memberIndex) { ... }
    public void setBuilder (SOAPInstanceBuilder builder) { ... }
}
```

In the above exemplary definition, the setInstance method is called by a deserializer when the object that is being deserialized is instantiated (i.e., when "new" is called). The object may not have to be completely deserialized in order to call setInstance, rather it may only have been constructed.

The getInstance method may be used by deserializers to obtain a reference to the object during the deserialization process.

The isComplete method may be called to determine whether or not the object has been completely deserialized. The doneReading method may be called by an object's deserializer to notify the serialization framework that it has completed deserializing the object's data members. The notification may reflect that the XML element representing the object has been completely processed, while at the same time indicating that there may still be some unresolved dependencies on other objects.

The setDeserializer method may be called to indicate to the serialization framework which deserializer to use for the object to be deserialized. This information may be used by the serialization framework when it is time to deserialize trailing blocks that represent multiple-reference objects.

The registerListner method may be used by the deserializer of a parent object to declare a dependency on a member object that has not yet been completely deserialized, and is thus unavailable. Further, this method may be used by the deserializer to request that it be notified as the deserialization of the member object progresses. That is, the deserializer for the parent object may call registerListener on the SOAPDeserializationState for the member object, passing as parameters a reference to the parent's SOAPDeserializationState object and an index that uniquely identifies the member within the parent. This call may set up the necessary callback relationship that allows the parent deserializer to be notified when the member object has been completely deserialized, thus allowing it to complete deserialization of the parent object.

As mentioned above, the SOAPDeserializationState object may be used by the SOAPDeserializationContext class during a deserialization process. Immediately below is a exemplary definition of a SOAPDeserializationContext class in accordance with one aspect consistent with certain features related to the present invention:

```
public class SOAPDeserializationContext:
        complements java.xml.rpc.encoding.DeserializationContext {
    // ...
    public SOAPDeserializationContext ( )
            throws DeserializationException { ... }
    public SOAPDeserializationState getStateFor (String id) { ... }
    public void deserializeRemainingElements (XMLReader reader)
            throws DeserializationException { ... }
}
```

The getStateFor method in the above exemplary definition may be used to obtain a reference to the SOAPDeserializationState for the object with a particular ID. The first time the state for particular ID is requested, the context may create a new SOAPDeserializationState for that object and add it to an internal state map. The deserializeRemainingElements method may be called at the end of a deserial ization process to deserialize the independent elements (or trialing blocks) that represent the multiple-reference objects.

The Deserialize Method

The workhorse for a deserialization process performed by a host JAX-RPC runtime system may be the deserialize method. A deserializer for each Java type may implement this method in a way that is appropriate for the respective data type. For example, the deserializer for a JavaBean may deserialize each of the bean's properties, set these properties on a new instance of the bean, and return the new bean instance as the result of the deserialize method.

As previously mentioned, the deserialize method may either return a reference to an object that is being deserialized, or a SOAPDeserializationState object for the object. Enabling a host JAX-RPC runtime system to return the SOAPDeserialization state object may allow the source that called the deserialize method (e.g., the deserializer of a parent object), to register for events that will allow it to eventually complete its deserialization. Accordingly, the source that calls the deserialize method may check the return value of this method to determine whether the value is the object itself or the SOAPDeserializationState object that represents the incomplete deserialized object. In one aspect consistent with certain features related to the present invention, the check of the return value may be performed using Java's instanceof operator.

When the deserialize method invoked by a deserializer completes its processing, the object being deserialized may be in one of four states, complete, none, created, and initialized. In a complete state, an object may have been completely deserialized by a deserializer. In the remaining three states, however, an object may have dependencies on at least one member object that may not have yet been completely deserialized, thus preventing deserialization of the parent object.

An object may be in a none state when at least one incomplete member object is required as a constructor parameter for the parent object, thus preventing the deserializer from instantiating the parent object until the member is completely deserialized. An object may be in a created state when the deserializer is able to instantiate the object by calling "new," but may not be able to completely initialize the other members of the object because of one or more incomplete member objects. Last, an object may be in a initialized state when the deserializer may be able to instantiate the object and initialize all of its members, but at least one of the members is still not entirely complete (i.e., not deserialized even though it has been instantiated). When an object is in either the none, created, or initialized state, the deserialize method may return the a SOAPDeserializationState object as its return value.

The following code fragment reflects an exemplary definition of a deserialize method that may be implemented by a deserializer in accordance with certain features related to the present invention:

```
public Object deserialize (QName, XMLReader reader,
                           SOAPDeserializationContext context)
                    throws DeserializationlException {
    if (the element's name does not match the expected name) {
        throw exception
    }
    if (the element is an HREF) {
        String href = the value of the element's href attribute
        SOAPDeserializationState state = context.getStateFor (href);
        state.setDesersializer (this);
        if (State.isComplete ( )) {
            return state.getInstance ( );
        }
        else {
            return state;
        }
    }
    if (the element has an xsi:type attribute) {
        if (the xsi:type attribute does not have the expected value) {
            throw exception
        }
    }
    if (the element has an xsi:null attribute && xsi:null == "true") {
        if (the element has an id attribute) {
            String id = the value of the element's id attribute
            SOAPDeserializationState state = context.getStateFor (id);
            state.setDeserializer (this);
            state.setInstance (null);
            state.doneReading ( );
        }
        return null;
    }
    Object { } member = new Object [number of member];
    SOAPDeserializationSatte state = null;
  Boolean isComplete = true;
  if (the element has an id attribute) {
    String id = the value of the element's id attribute
    state = context.getStateFor(id);
    state.setDeserializer(this);
  }
  for each member of this object {
    SOAPDeserializer memberDeser = the deserializer for the member
    QName memberName = the expected QNAME of member's sub-element
    XMLReader memberReader =
        XMLReader for the member's sub-element
    Object member[i] = memberDeser.deserialize(memberName,
                                    memberReader,
                                    context);
    if (member[i] instanceof SOAPDeserializationState) {
        isComplete = false;
        if (state == null) {
        //   it's a single-reference object (i.e., no id attribute)
            state = new SOAPDeserializationSatte ( );
        }
        SOAPDeserializationState memberState =
            (SOAPDeserializationState)member[i];
    }
  }
  if (isComplete) {
    instantiate and completely initialize a new instance
    if (state != null) {
        state.setInstance (instance);
        state.doneReading ( );
    }
    return instance;
  }
  else {
    if (all constructor arguments are available) {
        instantiate a new instance
        initialize the new instance as completely as possible
        state.setInstance (instance);
    }
    SOAPBuilder builder = a new builder initialized with whatever
                    state will be needed later to finish
                    deserializing the object
```

```
        state.setBuilder (builder);
        state.doneReading ( );
        return state;
    }
}.
```

Instance Builders

When a deserializer is unable to completely deserialize an object, it may be configured to perform two functions. First, the deserializer may register the SOAPDeserializationState for the parent object as a listener with the SOAPDeserializationState of the incomplete member object. This may allow the deserializer to be notified of progress made in the deserialization of the member object. Second, the deserializer may store state information that has been accumulated during the deserialize method and may be needed at a later time to finish deserializing the parent object when the member object is complete. For example, the deserializer may store the values of some members that were completely deserialized during a call to deserialize that may be needed later to complete initialization of an object.

Because deserializers may be stateless, they may be incapable of storing state information that will be needed later to complete deserialization of an object when its member objects are complete. To overcome this, methods, systems, and articles of manufacture consistent with certain features related to the present invention enable a deserializer to create an instance builder. An instance builder may be a mechanism used to store any state that may be used at a later time to complete the deserialization of an object once its member objects have been deserialized. For example, when a deserializer is only able to partially deserialize an object, it may create an instance builder and store a reference to the builder in the object's SOAPDeserializationState.

In addition to storing state information, instance builders may be responsible for completing deserialization of a parent object. The serialization framework implemented by methods, system, and articles of manufacture consistent with the present invention may notify an instance builder when deserialization of its member objects has progressed to a point that the instance builder will be able to construct the parent object and complete its initialization. Accordingly, an instance builder may be an extension of the stateless deserializer that originally began deserializing a parent object.

In one aspect consistent with certain features related to the present invention, an instance builder may be a Java class that implements the SOAPInstanceBuilder interface, and may be defined as:

```
package com.sun.xml.rpc.encoding.soap;
public interface SOAPInstanceBuilder {
       public int memberGateType (int memberIndex);
       public void setMember (int index, Object memberValue);
       public void construct ( );
       public void initialize ( );
       public void setInstance (Object instance);
       public Object getInstance ( );
}.
```

In the above exemplary definition, the memberGateType method may be called by the serialization framework to query the instance builder about the types of dependencies it may have with incomplete member objects. The value returned by this method for a particular member indicates to the framework whether the instance builder needs the particular member for construction or initialization. Further the returned value may also indicate to the framework how complete the member object must be before the instance builder can make use of it. For example, the returned value may indicate whether the instance builder requires a member object to be in a created, initialized, or complete state. This information may allow the framework to determine when deserialization has progressed far enough that the instance builder should be able to instantiate or initialize the object.

The setMember method may be called by the framework to notify the instance builder whenever one of its member objects have been instantiated. The construct method may be called by the framework when all members needed for construction are ready, thus allowing the instance builder to instantiate the object. The initialize method may be called when all members needed to complete initialization of the object are completely deserialized and are ready for initialization. The setInstance method may be called to provide the instance builder with a reference to the object, thus allowing the instance builder to have a reference to the object when, for example, the object was instantiated by the deserializer before the instance builder was created (e.g., during the deserialize method). The getInstance method may be called to get a reference to the object after it has been instantiated by the instance builder (e.g., after a call to initialize).

Deserializing Trailing Blocks

In order to completely deserialize an object graph, a host JAX-RPC runtime system may invoke a deserializer for each root of the graph in the same order that the roots were originally serialized. Once this is done, the host runtime system may call the deserializeRemainingElements method on the SOAPDeserializationContext to complete deserialization of the trailing blocks that represent multiple-reference objects. For example, consider the following exemplary code that reflects an object graph that has been serialized and encoded using a SOAP protocol:

```
<home-address href = "#ID-1">
<tns:Address xsi:type = "tns:Address"id="ID-1">
       <street bref = "#ID-2"/>
       <city href = "#ID-3"/>
       <state href = "#ID-4"/>
       <zip href = "#ID-5"/>
</tns:Address>
<xsd:string xsi:type = "xsd:string"id = "ID-2">1234 Riverside Drive</
xsd:string>
```

-continued

```
<xsd:string xsi:type = "xsd:string"id = "ID-3">Gainseville</xsd:string>
<xsd:string xsi:type = "xsd:string"id = "ID-4">Georgia</xsd:string>
<xsd:string xsi:type = "xsd:string"id = "ID-5">30506</xsd:string>.
```

The code that may be used by a host JAX-RPC runtime system to deserialize the above exemplary object graph may be defined as:

```
XMLReader reader = new XMLReader (. . .);
SOAPDeserializationContext deserContext =
                new SOAPDeserializationContext (. . .);
AddressDeserializer addressDeser = new AddressDeserializer (. . .);
Object obj = addressDeser.deserialize (
                new QName (null, "home-address"),
                reader, deserContext);
deserContext.deserializeRemainingElements (reader);
Address address = null;
if (obj instanceof SOAPDeserializationState) {
address = (Address) (((SOAPDeserializationState)obj).getInstance( ));
}
else {
address = (Address)obj;
};
```

To better understand the deserialization process consistent with certain features related to the present invention, FIG. 13 shows a flowchart of another exemplary deserialization process that may be performed by a host JAX-RPC system when deserializing a received encoded message. As shown, the host runtime system may create an instance of the deserializer class for an object (i.e., a target object) included in an object graph encoded in a serialized message received by the host runtime system (Step 1302). The host JAX-RPC runtime system may then invoke the deserialize method on the deserializer to attempt to deserialize the target object (Step 1304). If the object can be completely deserialized by the deserialize method (Step 1306), such as when the target object is a single-reference type object (i.e., no member objects, or all member objects and their corresponding sub-member objects that are associated with the member objects, have been completely deserialized), the method may return a reference to the deserialized object (Step 1308). The host JAX-RPC runtime system may then determine whether there are any more objects that need to be deserialized (Step 1310), and if so, the deserialize process may return to Step 1302. On the other hand, if there are no more objects to be deserialized, the process may end (Step 1312).

Referring back to Step 1306, if the target object cannot be completely deserialized (Step 1304; NO), such as when the target object is associated with to other member objects that have not been completely deserialized, a SOAPDeserializationState object associated with the target object may be created (Step 1314) returned as a return value for the deserialize method (Step 1316). Further, any member objects that have not been deserialized may also have a corresponding SOAPDeserializationState object associated with them as well. In one aspect consistent with certain features related to the present invention, the deserializer associated with the target object may check the return value of the deserialize method performed on the target object to determine whether it includes a SOAPDeserializationState object or a reference to the deserialized object itself. This check performed by the deserializer indicates whether the target object was completely deserialized. If the return value includes the SOAPDeserializationState object, this may represent that the target object could not be completely deserialized.

Based on the determination that the target object could not be completely deserialized, as represented by the returned SOAPDeserializationState object, the deserializer may then register the SOAPDeserializationState object associated with the target object as a listener with SOAPDeserializationState objects that may have been created for any member objects that have not been deserialized (Step 1318). That is, the SOAPDeserializationState object associated with the target object may be configured to monitor the status of the deserialization state associated with one or more member objects associated with the target object. Additionally, the deserializer may create an instance builder and store a reference to the builder in the SOAPDeserializationState object for the target object (Step 1320).

The instance builder then waits while the deserialization for the target object's member objects are deserialized. In one aspect consistent with certain features related to the present invention, the instance builder may wait for a notification from the serialization framework implemented within the host JAX-RPC runtime when all of the target object's members are deserialized (Step 1322). The notification may be based on the SOAPDeserializationState object monitoring the deserialization status for each member object associated with the target object. If a notification is received by the instance builder (Step 1322; YES), it may complete deserialization of the target object by instantiating and initializing the target object (Step 1326). If a notification is not received (Step 1322; NO), the deserialization of the one or more member object associated with the target object may continue (Step 1324). If, on the other hand, the instance builder does receive a notification from the framework (Step 1322; YES), the instance builder instantiates and initializes the target object (Ste 1326).

Once the target object is initialized, the JAX-RPC runtime system may determine whether there are any more objects in an object graph that is associated with the encoded message received by the host runtime system (Step 1328). If so, the deserialize process may return to Step 1304 to deserialize another object. If there are no more objects to deserialize, any trailing blocks associated with the object graph may be deserialized by calling the deserializeRemainingElements method on the SOAPDeserializationContext interface (Step 1330).

Therefore, because of the recursive nature of the deserialize process, the JAX-RPC runtime system may handle object graphs of arbitrary depth. Further, cyclic object graphs may be processed without requiring extra computations to prevent infinite looping on graph cycles.

In one aspect consistent with certain features related to the present invention, type information may be present in a serialized data stream as it is received by a host runtime system. The host system may associate deserialization mechanisms that are used to deserialize the data stream with the type information. Each mechanism may contain type information associated with down stream neighbors of objects (nodes that reflect objects in an object graph) that the mechanism can deserialize. A downstream neighbor of an object may be associated with data elements or objects that are positioned elsewhere in the data stream of serialized data elements received by the host runtime system. For example, an object or node that is referenced by a data element in a first position of a data stream, may be located in a position further down in the stream of serialized data elements. Accordingly, the host runtime system may identify the type of each element in the data stream that encodes a node in an object graph as it is encountered. If an element in the data stream is actually a reference to a serialized object or node located elsewhere in the data stream, the type (and the deserialization mechanism) may be associated with the reference such that the data in the element that actually contains the object or node can be deserialized when it is encountered.

Further, methods, systems, and articles of manufacture consistent with the present invention places minimal restrictions on the ordering of data in the data stream received by the host runtime system. One skilled in the art will recognize that if objects or nodes in an object graph appear in the data stream after they are first referenced, the deserialization process performed by the host runtime system may function optimally. Objects or nodes that appear prior to being referenced, however, may contain type information that allows their corresponding deserialization mechanism to be identified to allow these objects or nodes to be deserialized at a later time. Also, objects or nodes that refer to themselves may be deserialized by the host runtime system and objects or nodes that are referenced only once can be serialized as nested elements of their parent objects or nodes, and thus deserialized accordingly.

As described, certain aspects consistent with features related to the present invention enable a computing system to deserialize serialized data in a single pass, thus reducing processing time and memory space usage because the data stream is consumed as it is encountered rather than being stored and rescanned during subsequent deserialization processes. Objects that are under construction during a deserialization process performed by a host runtime system may be passed as a subset of its members that are used during the construction process. Generally, the construction of such an object may not be possible until all the members of the subset are available and/or may be manipulated by the host system. A member may be available if it has been deserialized in accordance with certain features related to the present invention. Accordingly, in one aspect consistent with certain features related to the present invention, the host runtime system may track the relative completeness of all member sets of all the objects in an object graph to be constructed during deserialization of a data stream of serialized data elements. Those objects that have identified member sets that are determined to be complete may be constructed. This process may also be followed for member initialization. Methods that are used to initialize data members may have side-effects on their parameters. Accordingly, in one aspect consistent with certain features related to the present invention, the host runtime system may include provisions that ensure that an object that is used as a parameter for an initialization method is complete before being used.

CONCLUSION

As described, methods, systems, and articles of manufacturer consistent with features of the present invention enable a computing system to deserialize data as it is received, thus reducing the processing time associated with storing and re-processing the data at a later time. Although the configuration of the systems and methods described above allow the present invention to perform the processes described above and illustrated in the figures, variations of these processes may be implemented without departing from the scope of the invention. For example, methods, systems, and articles of manufacturer, consistent with features of the present invention may be implemented using various network models, and are limited to the implementation of Java compliant systems and processes. Any number of programming languages may be utilized without departing from the scope of the present invention.

Furthermore, one skilled in the art would realize that the above described exemplary codes and names of methods, interfaces, packages, classes, etc. associated with these codes are not intended to be limiting. One skilled in the art would realize that any number of programming pseudo-code and syntax may be implemented to perform the functions consistent with certain features and principles related to the present invention. Additionally, methods, systems, and articles of manufacture consistent with certain features related to the present invention are not limited to perform the processes in the exact sequence described in the figures. For example, as shown in FIG. 3, the deployment descriptor may be defined (Step 330) prior to, or concurrently with, the creation and configuration of a WAR file (Step 325) without departing from the scope of the invention.

Additionally, although aspects of the present invention are described as being associated with data stored in memory and other storage mediums, one skilled in the art will appreciate that these aspects can also be stored on or read from other types of computer-readable media, such as secondary storage devices, like hard disks, floppy disks, or CD-ROM, DVD, a carrier wave from the Internet; or other forms of RAM or ROM. Accordingly, the invention is not limited to the above described aspects of the invention, but instead is defined by the appended claims in light of their full scope of equivalents.

What is claimed is:

1. A method for processing messages, comprising:
receiving a serialized message including a target object;
invoking a deserialize process of a deserializer associated with the target object;
configuring a state object resulting from the deserialize process to monitor a deserialization status; and
creating an instance builder that initializes the target object based on the deserialization status.

2. The method of claim 1, wherein the deserializer is an instance of a stateless deserialization class and the instance builder completes deserialization of the target object for the deserializer.

3. The method of claim 1, wherein invoking a deserialize process comprises:
   performing the deserialize process on the target object; and
   generating the state object based on a determination that the target object could not be deserialized.

4. The method of claim 3, wherein the determination that the target object could not be deserialized is based on a determination that an associated member object is not deserialized.

5. The method of claim 1, wherein configuring a state object is performed by the deserializer and comprises:
   registering the state object as a listener object with another state object associated with at least one member object; and
   notifying the deserializer when the at least one member object is deserialized.

6. The method of claim 5, wherein creating an instance builder further comprises:
   initializing, by the instance builder, the target object based on the notification.

7. The method of claim 1, wherein the target object is associated with a plurality of member objects and the instance builder stores data associated with each member object that is deserialized by the deserialization process.

8. The method of claim 7, wherein the instance builder initializes the target object using the stored data.

9. The method of claim 7, wherein the instance builder initializes the target object when it receives a notification associated with each member object that the respective member object is deserialized.

10. A method for deserializing a message, comprising:
    extracting a target object associated with one or more member objects from a received message;
    performing a deserialize process on the target object that provides a state object associated with target object when the target object cannot be completely deserialized;
    configuring the state object to notify a deserializer associated with the target object when the one or more member objects are deserialized; and
    completing deserialization of the target object when the notification is received by the deserializer.

11. The method of claim 10, wherein completing deserialization comprises:
    constructing and initializing the target object.

12. The method of claim 11, wherein each of the one or more member objects is deserialized when it is instantiated and initialized and any referenced objects is instantiated and initialized.

13. The method of claim 11, wherein each of the one or more member objects is deserialized when the respective member object is instantiated and at least one object that references the member object is not initialized.

14. The method of claim 10, wherein performing the deserialize method on the target object further comprises:
    returning the state object when at least one of the one or more member objects is not deserialized.

15. The method of claim 10, wherein completing deserialization comprises:
    configuring an instance builder for the target object;
    providing the notification to the instance builder; and
    completing, by the instance builder object, the deserialization of the target object based on the notification.

16. The method of claim 10, wherein the deserializer receives the notification in response to the deserializer requesting a deserialization state associated with the one or more member objects from the state object.

17. A method for constructing an object graph from a serialized message, comprising:
    receiving a message including a plurality of serialized objects reflecting an object graph; and
    constructing a deserialized object graph from the message, comprising:
    for each target object included in the object graph,
       determining whether the object could be deserialized based on a deserialization status of one or more member objects associated with the target object,
       returning a state object to a deserializer associated with the target object based on the determination,
       storing state data associated with a deserialization process associated with each of the one or more member objects, and
       using the stored state data to instantiate and initialize the target object in response to a notification that each of the one or more member objects associated with the target object is deserialized.

18. A data processing system, comprising:
    a memory including:
       a first set of instructions for deserializing a target object included in a serialized message received by the data processing system and providing a state object reflecting that the target object is not completely deserialized, and
       a second set of instructions for receiving an indication reflecting a deserialization state of a member object associated with the target object and for completely deserializing the target object based on the deserialization state; and
    a processor for executing the first and second set of instructions included in the memory.

19. The data processing system of claim 18, wherein the first set of instructions is invoked by a deserializer that creates an instance builder corresponding to the second set of instructions based on the state object.

20. The data processing system of claim 18, wherein the second set of instructions stores state information associated with the member object that is used to deserialize the target object.

21. The data processing system of claim 18, wherein the target object is associated with member objects and the second set of instructions completely deserializes the target object when the member objects are completely deserialized.

22. The data processing system of claim 18, wherein the second set of instructions completely deserializes the target object when the member object is initialized and a sub-member associated with the member object is initialized.

23. The data processing system of claim 18, wherein the second set of instructions completely deserializes the target object when the member object is instantiated and at least one sub-member object associated with the member object is not initialized.

24. The data processing system of claim 18, wherein the first set of instructions invokes a deserialization method that provides the state object.

25. The data processing system of claim 18, wherein the first set of instructions invokes a deserialization method that returns a value reflecting either a reference to any object that it can completely deserialize or a reference to the state object.

26. The data processing system of claim 18, wherein the memory further comprises:

a third set of instructions that invokes a deserialization method, configures the state object to monitor the deserialization state of the member object, and provides the indication reflecting the deserialization state to an instance builder corresponding to the second set of instructions.

27. The data processing system of claim 26, wherein the third set of instructions provides the indication to the instance builder when the deserialization state reflects that the member object is deserialized.

28. The data processing system of claim 26, wherein the third set of instructions checks the return value to determine whether the target object is completely deserialized.

29. The data processing system of claim 28, wherein the third set of instructions invokes the instance builder based on the determination that the return value includes a reference to the state object.

30. A system for deserializing objects encoded in a message, comprising:
    a client for providing a message including serialized objects; and
    a server for receiving the message and deserializing the serialized objects, the server comprising:
        a first process component configuring an instance of a deserializer class that invokes a deserialize method for a target object included in the received message,
        a second process component configuring a state object based on a result of the invocation of the deserialize method,
        a third process component monitoring a status reflecting a performance of the deserialize method on a member associated with the target object,
        a fourth process component for providing the status to the deserializer instance when the member object is deserialized by the deserialize method, and
        a fifth process component for deserializing the target object based on the provided status.

31. A computer-readable storage medium including instructions for performing a method, when executed by a processor, for processing messages, the method comprising:
    receiving a serialized message including a target object;
    invoking a deserialize process of a deserializer associated with the target object;
    configuring a state object resulting from the deserialize process to monitor a deserialization status; and
    creating an instance builder that initializes the target object based on the deserialization status.

32. The computer-readable storage medium of claim 31, wherein the deserializer is an instance of a stateless deserialization class and the instance builder completes deserialization of the target object for the deserializer.

33. The computer-readable storage medium of claim 31, wherein invoking a deserialize process comprises:
    performing the deserialize process on the target object; and
    generating the state object based on a determination that the target object could not be deserialized.

34. The computer-readable storage medium of claim 33, wherein the determination that the target object could not be deserialized is based on a determination that an associated member object is not deserialized.

35. The computer-readable storage medium of claim 31, wherein configuring a state object is performed by the deserializer and comprises:
    registering the state object as a listener object with another state object associated with at least one member object; and
    notifying the deserializer when the at least one member object is deserialized.

36. The computer-readable storage medium of claim 35, wherein creating an instance builder further comprises:
    initializing, by the instance builder, the target object based on the notification.

37. The computer-readable storage medium of claim 31, wherein the target object is associated with a plurality of member objects and the instance builder stores data associated with each member object that is deserialized by the deserialization process.

38. The computer-readable storage medium of claim 37, wherein the instance builder initializes the target object using the stored data.

39. The computer-readable storage medium of claim 37, wherein the instance builder initializes the target object when it receives a notification associated with each member object that the respective member object is deserialized.

40. A computer-readable storage medium including instructions for performing a method, when executed by a processor, for deserializing a message, the method comprising:
    extracting a target object associated with one or more member objects from a received message;
    performing a deserialize process on the target object that provides a state object associated with target object when the target object cannot be completely deserialized;
    configuring the state object to notify a deserializer associated with the target object when the one or more member objects are deserialized; and
    completing deserialization of the target object when the notification is received by the deserializer.

41. The computer-readable storage medium of claim 40, wherein completing deserialization comprises:
    constructing and initializing the target object.

42. The computer-readable storage medium of claim 41, wherein each of the one or more member objects is deserialized when it is instantiated and initialized and any referenced objects is instantiated and initialized.

43. The computer-readable storage medium of claim 41, wherein each of the one or more member objects is deserialized when the respective member object is instantiated and at least one object that references the member object is not initialized.

44. The computer-readable storage medium of claim 40, wherein performing the deserialize method on the target object further comprises:
    returning the state object when at least one of the one or more member objects is not deserialized.

45. The computer-readable storage medium of claim 40, wherein completing deserialization comprises:
    configuring an instance builder for the target object;
    providing the notification to the instance builder; and
    completing, by the instance builder object, the deserialization of the target object based on the notification.

46. The computer-readable storage medium of claim 40, wherein the deserializer receives the notification in response to the deserializer requesting a deserialization state associated with the one or more member objects from the state object.

47. A computer-readable storage medium including instructions for performing a method, when executed by a processor, for constructing an object graph from a serialized message, the method comprising:
    receiving a message including a plurality of serialized objects reflecting an object graph; and constructing a deserialized object graph from the message, comprising:
for each target object included in the object graph,
determining whether the object could be deserialized based on a deserialization status of one or more member objects associated with the target object,
returning a state object to a deserializer associated with the target object based on the determination,
storing state data associated with a deserialization process associated with each of the one or more member objects, and
using the stored state data to instantiate and initialize the root object in response to a notification that each of the one or more member objects associated with the target object is deserialized.

48. A system for processing messages, comprising:
means for receiving a serialized message including a target object;
means for invoking a deserialize process of a deserializer associated with the target object;
means for configuring a state object resulting from the deserialize process to monitor a deserialization status; and
means for creating an instance builder that initializes the target object based on the deserialization status.

49. The system of claim 48, wherein the deserializer is an instance of a stateless deserialization class and the instance builder completes deserialization of the target object for the deserializer.

50. The system of claim 48, wherein the means for invoking a deserialize process comprises:
means for performing the deserialize process on the target object; and
means for generating the state object based on a determination that the target object could not be deserialized.

51. The system, of claim 50, wherein the determination that the target object could not be deserialized is based on a determination that an associated member object is not deserialized.

52. The system of claim 48, wherein the means for configuring a state object is included in the deserializer and further comprises:
means for registering the state object as a listener object with another state object associated with at least one member object; and
means for notifying the deserializer when the at least one member object is deserialized.

53. The system of claim 52, wherein the means for creating an instance builder further comprises:
means for initializing, by the instance builder, the target object based on the notification.

54. The system of claim 48, wherein the target object is associated with a plurality of member objects and the instance builder stores data associated with each member object that is deserialized by the deserialization process.

55. The system of claim 54, wherein the instance builder initializes the target object using the stored data.

56. The system of claim 54, wherein the instance builder initializes the target object when it receives a notification associated with each member object that the respective member object is deserialized.

57. A system for deserializing a message, comprising:
means for extracting a target object associated with one or more member objects from a received message;
means for performing a deserialize process on the target object that provides a state object associated with target object when the target object cannot be completely deserialized;
means for configuring the state object to notify a deserializer associated with the target object when the one or more member objects are deserialized; and
means for completing deserialization of the target object when the notification is received by the deserializer.

58. The system of claim 57, wherein the means for completing deserialization comprises:
means for constructing and initializing the target object.

59. The system of claim 58, wherein each of the one or more member objects is deserialized when it is instantiated and initialized and any referenced objects is instantiated and initialized.

60. The system of claim 58, wherein each of the one or more member objects is deserialized when the respective member object is instantiated and at least one object that references the member object is not initialized.

61. The system of claim 57, wherein the means for performing the deserialize method on the target object further comprises:
means for returning the state object when at least one of the one or more member objects is not deserialized.

62. The system of claim 57, wherein the means for completing deserialization comprises:
means for configuring an instance builder for the target object;
means for providing the notification to the instance builder; and
means for completing, by the instance builder object, the deserialization of the target object based on the notification.

63. The system of claim 57, wherein the deserializer receives the notification in response to the deserializer requesting a deserialization state associated with the one or more member object from the state object.

64. A system for constructing an object graph from a serialized message, comprising:
means for receiving a message including a plurality of serialized objects reflecting an object graph; and
means for constructing a deserialized object graph from the message, comprising:
means for each target object included in the object graph,
means for determining whether the object could be deserialized based on a deserialization status of one or more member objects associated with the target object,
means for returning a state object to a deserializer associated with the target object based on the determination,
means for storing state data associated with a deserialization process associated with each of the one or more member objects, and
means for using the stored state data to instantiate and initialize a root object in response to a notification that each of the one or more member objects associated with the target object is deserialized.

* * * * *

UNITED STATES PATENT AND TRADEMARK OFFICE
CERTIFICATE OF CORRECTION

| | |
|---|---|
| PATENT NO. | : 7,246,358 B2 |
| APPLICATION NO. | : 10/118153 |
| DATED | : July 17, 2007 |
| INVENTOR(S) | : Robert Chinnici et al. |

It is certified that error appears in the above-identified patent and that said Letters Patent is hereby corrected as shown below:

On the title page, item (54), line 1, "SYSTEM AND" should read --SYSTEMS, AND--.

In claim 63, column 58, line 40, "object from" should read --objects from--.

Signed and Sealed this

Eleventh Day of September, 2007

JON W. DUDAS
*Director of the United States Patent and Trademark Office*